United States Patent [19]

Kono et al.

[11] Patent Number: 5,187,589
[45] Date of Patent: Feb. 16, 1993

[54] MULTIPROGRAM VIDEO TAPE RECORDING AND REPRODUCING DEVICE

[75] Inventors: Mutsumi Kono; Satoshi Uchiumi, both of Saitama, Japan

[73] Assignee: Pioneer Electronic Corporation, Tokyo, Japan

[21] Appl. No.: 784,736

[22] Filed: Oct. 29, 1991

Related U.S. Application Data

[63] Continuation of Ser. No. 313,272, Feb. 21, 1989, abandoned.

[30] Foreign Application Priority Data

Jul. 28, 1988 [JP] Japan .................. 63-188966
Jul. 28, 1988 [JP] Japan .................. 63-188967

[51] Int. Cl.⁵ .................................................. H04N 5/76
[52] U.S. Cl. .................................... 358/335; 360/20
[58] Field of Search ............ 358/335, 310, 320, 339, 358/183, 181, 22, 142, 316, 334; 360/18, 20, 19.1, 9.1, 33.1, 28

[56] References Cited

U.S. PATENT DOCUMENTS

| | | | |
|---|---|---|---|
| 3,686,434 | 8/1972 | Lemelson | 360/18 |
| 3,811,008 | 5/1974 | Lee | 360/18 |
| 3,849,594 | 11/1974 | Justice | 358/142 X |
| 3,849,776 | 11/1974 | Swynford-Lain | 360/18 X |
| 3,860,745 | 1/1975 | Takada | 358/142 |
| 4,001,499 | 1/1977 | Dowell | 358/93 |
| 4,015,080 | 3/1977 | Moore-Searson | 358/109 X |
| 4,031,548 | 6/1977 | Kato et al. | 360/33.1 |
| 4,070,695 | 1/1978 | Scholz et al. | 358/142 X |
| 4,074,315 | 2/1978 | Kawamura et al. | 358/142 |
| 4,272,784 | 6/1981 | Saito et al. | 358/335 |
| 4,485,413 | 11/1984 | Furuta et al. | 358/334 |
| 4,575,772 | 3/1986 | Shimada et al. | 360/19.1 |
| 4,656,527 | 4/1987 | Uchimi | 358/310 |
| 4,665,438 | 5/1987 | Miron et al. | 358/181 |
| 4,719,520 | 1/1988 | Isshiki | 360/20 |
| 4,758,902 | 7/1988 | Okamoto et al. | 360/18 |
| 4,761,688 | 8/1988 | Hakamada | 358/183 |
| 4,774,597 | 9/1988 | Harvey | 360/9.1 |
| 4,816,915 | 3/1989 | Imai et al. | 358/181 |
| 4,872,056 | 10/1989 | Hicks et al. | 358/183 |
| 4,890,168 | 12/1989 | Inoue et al. | 358/183 |

Primary Examiner—Tommy P. Chin
Assistant Examiner—Thai Tran
Attorney, Agent, or Firm—Finnegan, Henderson, Farabow, Garrett and Dunner

[57] ABSTRACT

A video tape recording and reproducing device and a related method having a recording and a reproducing mode including a plurality of tuners for concomitantly receiving a plurality of television programs and generating a plurality of respective recording signals when in the recording mode, mixing means for producing a mixed recording signal responsive to the plurality of generated recording signals, recording means for recording the mixed recording signal on a video tape, reading means for reading the mixed recording signal from the video tape when in the reproducing mode, separating means for reproducing a selected recording signal from the mixed recording signal, and means for outputting the reproduced selected recording signal to an external device for producing the corresponding television program.

41 Claims, 14 Drawing Sheets

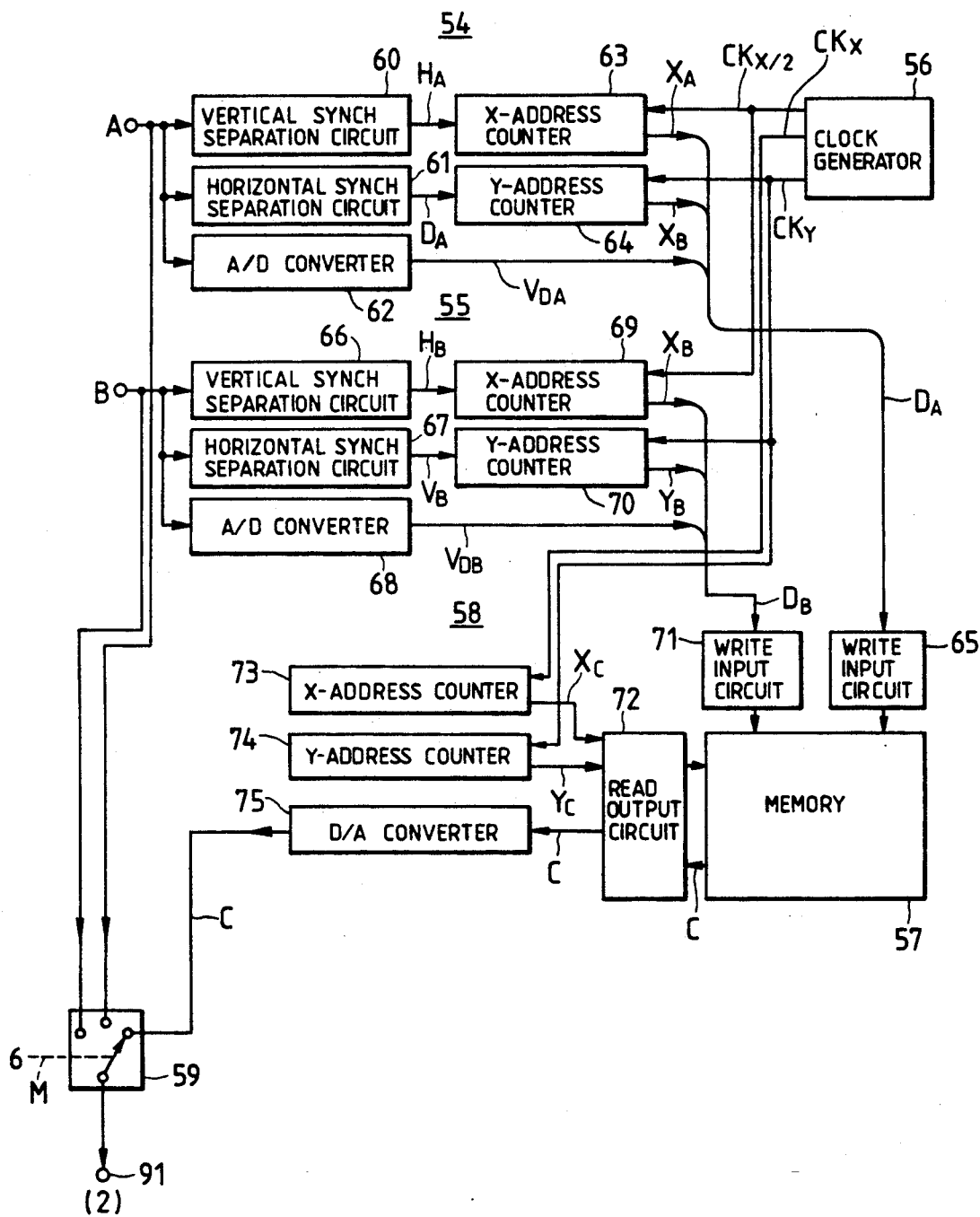

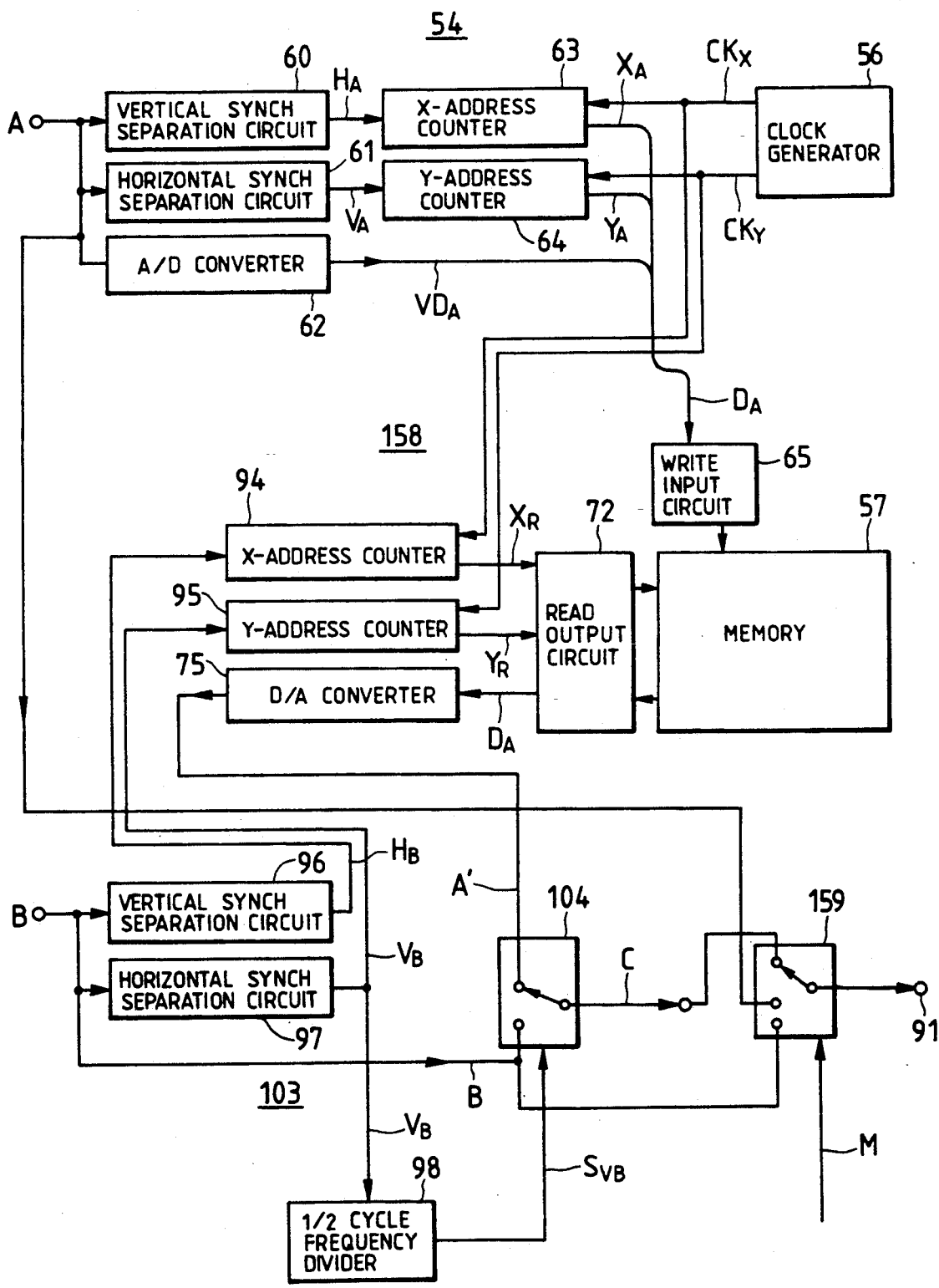

MULTIPROGRAM VIDEO TAPE RECORDING AND REPRODUCING DEVICE

This application is a continuation of application Ser. No. 07/313,272, filed Feb. 21, 1989, now abandoned.

BACKGROUND OF THE INVENTION

1. Field of the Invention

The present invention relates to a recording/reproducing apparatus for television ("TV") image and the like, and, particularly, relates to a video tape recorder ("VTR") for simultaneous recording/reproducing of multiple TV signals.

2. Description of the Prior Art

In general, this type VTR records on a video tape a TV signal received by a TV antenna or from a TV camera and reproduce the TV signal from the video tape according to an instruction by the user. The term "TV signal" used herein after includes video and audio signals.

This type VTR structurally includes a signal system and a mechanical system. The signal system further includes a TV signal processing system and a control signal processing system.

FIG. 1 shows the schematic diagram of a conventional VTR having such TV signal processing and control signal processing systems. The TV signal processing system includes a TV tuner 1 and a signal processing circuit 2. TV tuner 1 is disposed either inside the VTR or outside. In general, a single TV tuner 1 is provided. Signal processing circuit 2 performs various signal processing operations for recording and reproducing for luminance and color signals contained in the TV signal of a channel selected by TV tuner 1 whereby the TV signal can be sent to a tape head 4 included in a mechanical system 3. Signal processing circuit 2 also generates a reproducing signal which can be sent to a CRT (not shown). The description of signal processing circuit 2 is well known.

The control signal processing system includes an operation circuit 5, a timer circuit 6 and a system controller 7. Operation circuit 5 generates various instruction signals which correspond to the contents of instructions given by various operation buttons related to recording and reproducing. Timer circuit 6 sets reservation of video recording and the like. System controller 7 serves as a general controller which generates various control signals to operate, inside the VTR, electrically and mechanically in the order corresponding to the purposes of use in the recording and reproducing.

Mechanical system 3 has a tape head 4, a tape head actuating mechanism with a servo system thereof (not shown), and a tape loading mechanism (not shown). Mechanical system 3 is controlled by system controller 7.

A series of operations of a conventional VTR will be described hereinafter.

When a recording mode of the VTR is selected with a video tape 8 being loaded, the TV signal of one channel or station selected by TV tuner 1 is fed to signal processing circuit 2. Signal processing circuit 2 performs signal processing necessary for recording and then feeds the processed TV signal to tape head 4 to actuate tape head 4. By the actuation of tape head 4, the processed TV signal is then recorded magnetically on the video tape 8.

When a reproducing mode of the VTR is selected, a TV signal is reproduced from video tape 8, via tape head 4, in a reverse order to the aforesaid recording mode of operation, so that the TV signal is fed to the CRT.

Such conventional VTR has a problem in that a multiple number of TV signals or programs cannot be recorded/reproduced simultaneously in the same time slot.

For example, assume there are three video recording reservations set by timer circuit 6, as shown in FIG. 2. The time slots of RESERVE 1 and RESERVE 2 do not overlap, but the time slots of RESERVE 2 and RESERVE 3 partially overlap during a time period from 9:00 to 10:00. Since the conventional VTR is not capable of simultaneously recording more than one TV programs in the same time slot, either RESERVE 2 or RESERVE 3 must be selected during this overlapping time period. For example, if RESERVE 3 is set to have a higher priority than RESERVE 2 during this overlapping time period, the recording of RESERVE 2 will stop at 9:00 and the recording of RESERVE 3 will start at that time, as shown at the bottom portion of FIG. 2.

SUMMARY OF THE INVENTION

The object of the present invention is to provide a VTR which is designed to simultaneously record and reproduce a multiple number of TV signals or programs.

To achieve the object and in accordance with the purpose of the present invention, as embodied and broadly described herein, according to a first embodiment of the present invention, a VTR includes a write head for writing an input recording signal on a video tape, an input recording signal mixing circuit having a rewritable storage circuit for storing first and second input recording signals, an output switching circuit for switching between the first and second input recording signals read out from the storage circuit to feed a selected one of the first and second input recording signals to a read head, and a control circuit for generating a read control signal for controlling the reading of the second input recording signal from the storage circuit in synchronism with the reading of the first input recording signal and for generating a switching control signal for controlling the switching operation of the output switching circuit for each field of the first input recording signal.

According to a second embodiment of the present invention, a VTR includes a read head for reproducing first and second input recording signals alternatively recorded on a recording medium for each field, a reproducing signal separating circuit having a circuit for identification of the reproducing first and second recording signals, a rewritable storage circuit for storing a selected one of the reproducing first and second signals for each field, an output switching circuit for feeding the reproducing signals repeatedly read out from the storage circuit, and a control circuit for generating a write control signal to control the writing in the storage circuit in synchronism with the reproducing signals, for generating a read control signal to control the reading of the reproducing signals from the storage circuit and for generating a switching control signal to control the switching operation of the output switching circuit depending on mixing or non-mixing state of the reproducing signals.

According to a third embodiment of the present invention, a VTR includes a write head and an input recording signal mixing circuit as recited in the first embodiment and further includes a read head and a reproducing signal separating circuit as recited in the second embodiment.

According to a fourth embodiment of the present invention, a VTR has the same structual elements as in the third embodiment, wherein the input recording signal mixing and reproducing signal separating circuits constitutes a single circuit which operates reversibly, in that the single circuit is reversibly switched for the respective input recording and reproducing operations.

Some features of the first, second, third and fourth embodiments of the invention include:

(1) When a first reservation is ended during execution of a multiple program recording, switching for each field is locked in a memory readside so that a corresponding read-side field of the video memory deviates. After the phase of a vertical synchronizing signal in a read-side first video signal becomes substantially equal to the phase of the vertical synchronizing signal in a write-side second video signal, a switching control is performed to record a second received second video signal directly without writing into a memory.

(2) During the execution of a multiple program recording, an identification signal for identifying the multiple program recording is inserted into a recording signal.

(3) The identification signal has a predetermined frequency or a predetermined code and disposed between the pedestal and white levels in an effective horizontal period contained in a vertical blanking period of a field wherein the second video signal read from the video memory is selected as the recording signal.

(4) Insertion of the identificaiton signal between the fields is started at least two fields prior to the start of the multiple program recording.

(5) When the identification signal is detected in a reproducing signal, the reproducing signal is used as a write signal of the video memory while a write enable period of the memory is written between the fields as a field having no identification signal, so that a video signal repeatedly read from the memory is sent out.

(6) An operation portion is included to provide functions of indicating the multiple program recording through detection of the identification signal in the reproducing signal, feeding the reproducing signal to the video memory as a write signal, sending out the video signal repeatedly read from the memory, and judging whether the write-enable period of the memory is in a field having the identification signal or whether the write-enable period is in a field having no identification signal.

(7) At least two audio recording channels are provided. During the execution of a multiple program recording, audio signals contained in first and second programs are respectively recorded in first and second audio channels. During execution of a separated reproducting, the audio channels are selected corresponding to selected programs.

(8) When the selected programs employ a sterophonic sound system, left (L) and right (R) audio channels are mixed to form a monophonic sound during the execution of a mixed recording. In the case where the selected programs employ a bilingual system, the main sound is selected to be recorded in respective audio channels.

In the first embodiment, a first recording signal is directly fed to an output switching circuit through an output circuit of the first input recording signal. A second recording signal is temporarily stored in a storage circuit and then read from the storage circuit by a control circuit. The second recording signal is read out in synchronism with the first input recording signal, and is fed to the output switching circuit.

The output switching circuit performs switching of the recording signals for each field on the basis of a switching control signal from the control circuit, so that the first and second input recording signals are alternatively sent out for each field.

Timing of the alternate switching corresponds to an interlaced scanning of a CRT in a TV receiver connected to the VTR. Each of the CRT screen has two fields. Each of the first and second recording signals is assigned to a respective field, whereby the first and second input recording signals are mixed to form one mixed recording signal. The mixed recording signal is recorded on a video tape through a write head.

In the second embodiment of the present invention, a non-mixed recording signal reproduced from the video tape through a read head is fed to the output switching circuit. The reproduced mixed recording signal, indentified as such by detection of an identification signal contained therein, is temporarily stored in the storage circuit and then read from the storage circuit by the control circuit to be fed to the output switching circuit.

The output switching circuit continuously generates a readout signal of the storage circuit during reproducing of the mixed recording signal on the basis of the switching control signal from the control circuit. The reproduced mixed recording signal corresponding to the first and second recording signals is written into the storage circuit selectively in synchronism with each field, whereby one of the first and second recording signals is separated from the mixed recording signal. The separated recording signal is fed to the CRT screen and displayed thereon.

According to the third embodiment of the present invention, recording and reproducing of a multiple number of recording signals are accomplished by a single circuit. This single circuit provides both signal mixing during the recording and signal separating during the reproducing.

According to the fourth embodiment of the present invention, the recording and reproducing are made by a single circuit as recited in the third embodiment, wherein the signal mixing and the subsequent separating are reversible with respect to one another. Consequently, the circuit complexity is significantly reduced.

According to the fifth embodiment of the present invention, a VTR includes a signal processing circuit for processing recording signals from a video input to be fed to a video head and for processing reproduced recording signals from the video head, a mixing circuit for mixing a multiple number of the recording signals to be fed to the signal processing circuit, and a separating circuit for separating a mixed recording signal from the signal processing circuit into a multiple number of original recording signals.

According to the fifth embodiments of the present invention, the multiple number of original recording signals are mixed to be fed to the signal processing circuit by a mixing circuit. Mixing of the recording signals is made by generating a mixed recording signal, having different recording regions on a video tape. The signal processing circuit performs signal processing for the mixed recording signal and then the video head is actuated to record the mixed signal on the video tape.

During the reproducing, the mixed recording signal is reproduced from the video head and then fed to the separating circuit through the signal processing circuit again. The separating circuit separates the mixed recording signal into the multiple number of original recording signals. The separating of the mixed recording signal can be carried out in a course substantially reverse to the mixing of the original recording signals. The separated recording signals are fed to the CRT and reproduced on the screen thereof. Consequently, a multiple number of TV signals or programs in a same recording time slot are recorded and reproduced simultaneously.

According to the sixth embodiment of the present invention, a VTR of the fifth embodiment further includes a timer circuit capable of presetting recording start and end dates separately for a corresponding recording signal. The timer circuit is also arranged to feed a program mode signal indicating a multiple program recording to the mixing circuit during an overlapped recording time slot at time when a multiple number of recording signals overlap each other in a preset overlapped recording time slot.

Operation of the mixing circuit starts on the basis of the program mode signal so that the multiple number of recording signals are mixed in the preset overlapped time slot.

A seventh embodiment of the present invention will be described hereinafter.

The accompanying drawings, which are incorporated in and constitutes a part of this specification, illustrate several embodiments of the present invention and together with the description, serve to explain the principles of the invention.

BRIEF DESCRIPTION OF THE DRAWINGS

FIG. 17 is a schematic diagram of a mixing circuit according to the fifth embodiment of the present invention.

FIG. 21 is a schematic diagram of a mixing circuit according to the sixth embodiment.

DESCRIPTION OF THE PREFERRED EMBODIMENTS

Figure 1:
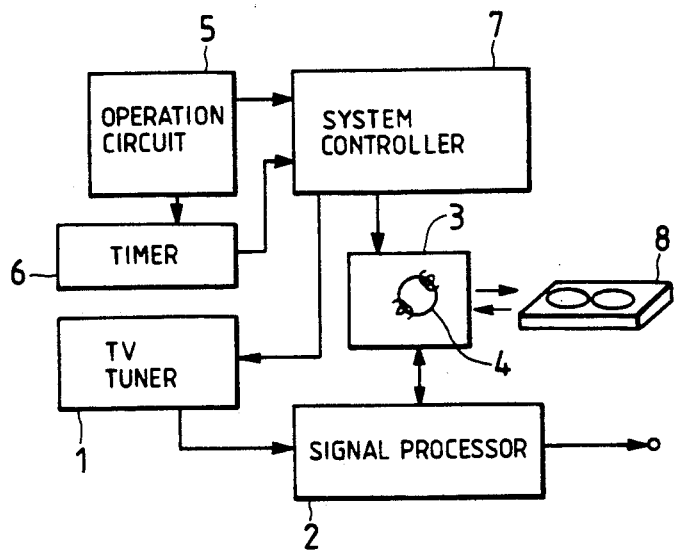
FIG. 1 is a schematic diagram of a conventional VTR.
Figure 2:
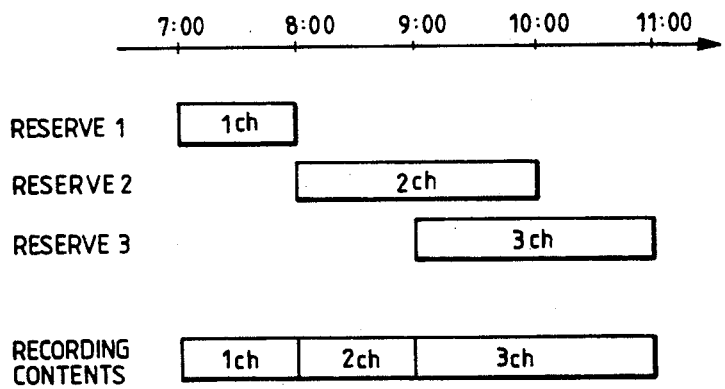
FIG. 2 is a time chart corresponding to a multiple program reservation for video recording.

Reference will now be made in detail to the present preferred embodiments of the invention, examples of which are illustrated in the accompanying drawings. Wherever possible, the same reference numerals will be used throughout the drawings to refer to the same or like parts.

The principle of multiple program recording and separated reproducing according to the first, second, third, and fourth embodiments of the present invention will be described in reference to FIGS. 3-6.

Figure 3:
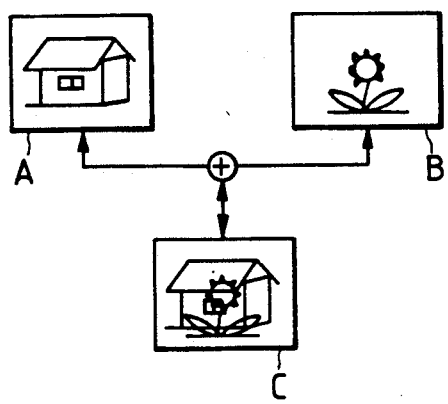
FIG. 3 is a concept illustration referring to the principle of mixing and separating.
Figure 4:
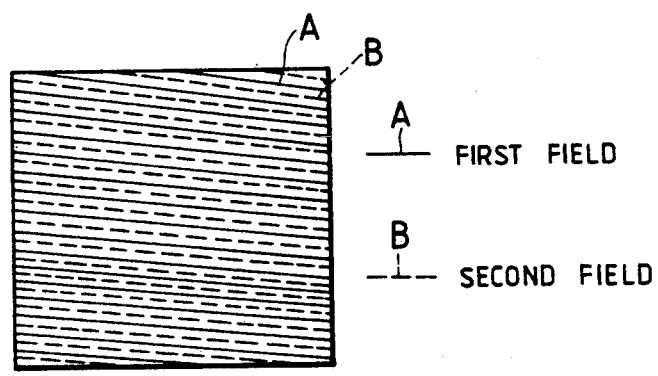
FIG. 4 is a sample CRT screen illustrating an interlaced scanning.

In FIG. 3, a mixed signal C is generated by mixing a first TV signal A and a second TV signal B, wherein corresponding TV programs overlap one another in a same time period as their corresponding screen images are recorded. When first and second TV signals A and B are reproduced, a selected one of first and second TV signals A and B is separated from mixed signal C. In the aforesaid embodiments of the present invention, scanning of the CRT screen is interlaced, as shown in FIG. 4. In other words, the CRT screen is synthesized from both first and second TV signals A and B by switching first and second TV signals A and B alternatively.

Figure 5:
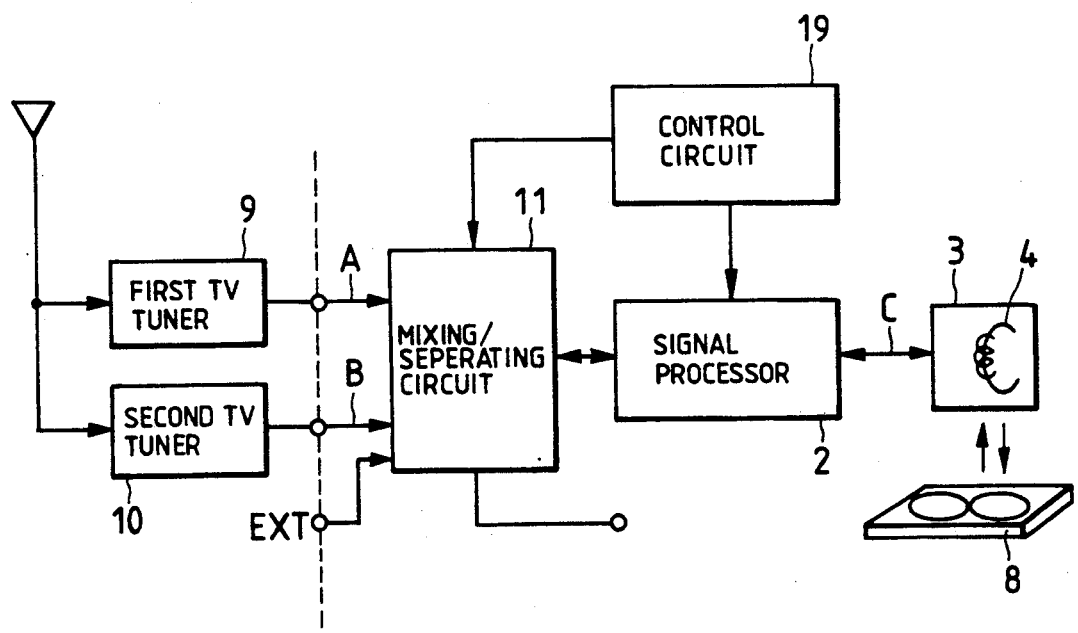
FIG. 5 is a schematic diagram of a VTR relating to the first, second, third, and fourth embodiments of the present invention.

FIG. 5 shows a schematic diagram of a VTR according to the aforesaid embodiments of the present invention.

The schematic diagram of FIG. 5 distinguishes over the schematic diagram of the prior art shown in FIG. 1 in several aspects as discussed hereinafter.

As shown in FIG. 5, a VTR according to the aforesaid embodiments of the present invention include two tuners, first and second TV tuners 9 and 10, respectively. Even more than two tuners can be provided with the VTR, according to the present invention. The VTR also includes a mixing/separating circuit 11 disposed between a signal processing circuit 2, and first and second TV tuners 9 and 10. Further distinction will be described hereinafter. Like parts are referenced with like reference numerals in FIGS. 1 and 5.

In FIG. 5, first and second TV tuners 9 and 10 select channels electronically for receiving TV broadcast signals in several frequency ranges such as VHF, UHF, BS (satellite broadcasting), CATV, and the like. Further, TV tuners 9 and 10 receive signals from at least two different channels or broadcast stations simultaneously and send out corresponding TV signals, a first TV signal A, and a second TV signal B respectively, into the VTR in the form of a composite video signal. TV tuners 9 and 10 is entirely or partially integrated into the VTR, or provided externally thereto.

Mixing/separating circuit 11 constitutes a single circuit and perfoms mixing and separating of the TV signals reversibly in that the mixing of first and second TV signals A and B to generate a mixed signal C is carried out during recording of the TV signals and the separating of a selected one of TV signals A and B from mixed signal C is carried out during reproducing of the TV signals.

The arrangement of mixing/separating circuit 11 for recording and reproducing will be described in reference to FIGS. 6 and 9 respectively, with respect to mixed recording and separated reproducing of video signals contained in the TV signals. The mixed recording and separated reproducing of audio signals will be described later.

The mixing and separating according to the present invention will be described in reference to FIG. 6.

Figure 6:
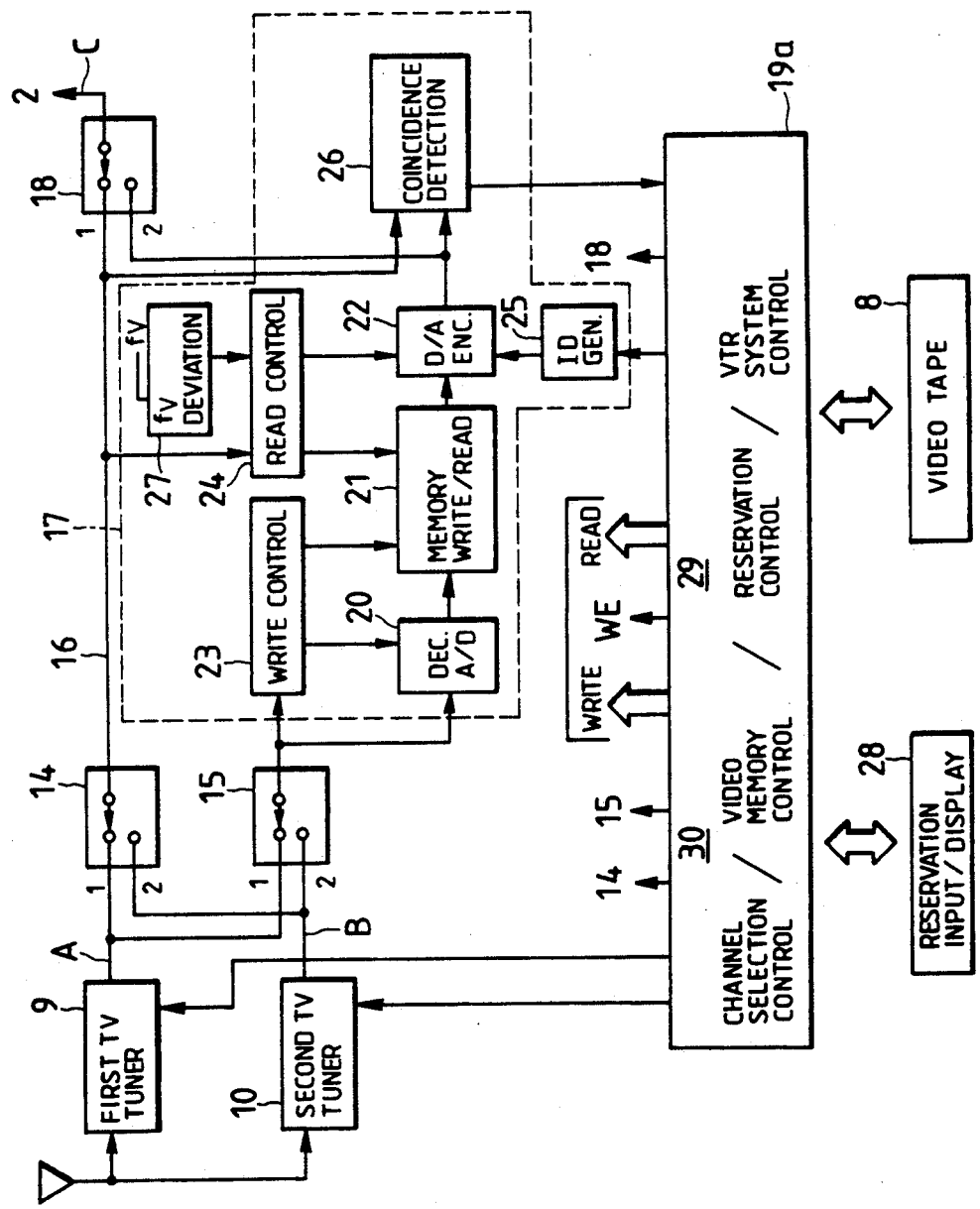
FIG. 6 is a schematic diagram of a mixing/separating circuit of FIG. 5 during recording.

In FIG. 6, mixing/separating circuit includes input switches 14 and 15 for selecting first and second TV signals A and B provided by first and second TV tuners 9 and 10 respectively, an output circuit 16 for sending out first TV signal A via input switch 14, a video memory circuit 17 for performing signal processing for the mixed recording and separated reproducing of the video signals contained in TV signals A and B, an output switch 18 for sending out selectively first TV signal A from output circuit 16 and second TV signal B from video memory circuit 17, and a control circuit 19a for controlling the operations of the aforesaid component parts of mixing/separating circuit.

Video memory circuit 17 includes a decode and A/D conversion circuit 20 for digitizing or converting second TV signal B from input switch 15 to digital values of luminance signal and color difference signal, a rewritable XY two-dimensional address memory 21 for storing the digital values of the converted second TV signal B, a D/A conversion and encode circuit 22 for converting back the digital value of the converted second TV signal B from memory 21 into a analog signal and for synthesizing a corresponding composite video signal.

Video memory circuit 17 further includes a write control circuit 23 for separating a synchronizing signal from second TV signal B and generating a corresponding address signal to control the writing or storing of the digital value of the converted second TV signal B from decode and A/D conversion circuit 20 into memory 21, a read control portion 24 for separating the synchronizing signal from first TV signal A selected by input switch 14 and generating a corresponding address signal to in turn generate another synchronizing signal for encoding in D/A conversion and encode circuit 22 and for controlling reading of the digital value of converted second TV signal B from memory 21, a $f_v$ deviation circuit 27 for giving deviation to a read-side vertical synchronizing frequency ($f_v$) while repealing the synchronizing function due to a vertical synchronizing signal input in read synchronizing control carried out by read control portion 24, and a coincidence detecting circuit 26 for detecting the coincidence of the phase of the read-side vertical synchronizing signal with respect to the vertical synchronizing signal input in the read synchronizing control carried out by read control portion 24 and an identification signal into the encoded output of D/A conversion encode circuit 22 during the recording to identify mixed recording signal C.

It is well known as a Nyquist sampling principle that the switching frequency of output circuit 18 has to be twice or more the frequency of the corresponding video signal. Second TV signal B is converted into a composite video signal in that color sub-carriers are superposed or converted into component signals, for example, luminance and color different composite signals (R-Y, B-Y).

In general, second TV signals B is encoded into component signals. Also in the aforesaid embodiments of the present invention, it is assumed that, second TV signal B is encoded into component signals. When second TV signal B is encoded into component signals, several A/D coverters may be provided for respective components signals or a signal B can be separated into component signals by dititial signal processing after A/D conversion of the signal into a composite signal.

Memory 21 has a two-dimensional data arrangement or address formation, substantially corresponding to that of a corresponding TV screen. Assuming now that 512 sample points are defined in an effective screen period of one horizontal scanning period (referred to hereinafter as "1H") and that 256H effective scanning lines are defined in one vertical scanning period (hereinafter "1V"), the total sample number is then $512 \times 256 = 131,072$ in that the H-direction arrangement is in the form of 9 bit address and the V-direction arrangement is n the form of 8 bit address. If each sample reviews 8 bits in the memory or 8 quantized bits, the required memory capacity becomes $131,072 \times 8 = 1.049$ megabits.

Data access of memory 21 is provided such that writing/reading of memory 21 are carried out substantially independently and in parallel In other words, data address for the writing/reading are defined independently so that the writing and reading are carried out in parallel without limitation.

D/A conversion and encode circuit 22 converts digital data from read control portion 24 into analog video signals. When an analog signal consists of component signals, encoder circuit 22 converts the component signals into a composite signal.

Write control circuit 23 controls the relation of a two-dimensional address of input TV signal B with that of memory 21 and, at the same time, controls the flow of data to memory 21. In doing so, write control circuit 23 generates address codes and command codes for memory 21.

The memory address and the input TV signal address normally have the relation of one-to-one correspondence. For example, if one memory address corresponds N input TV signal addresses, a screen compressed by 1/N is stored on the memory. If a deviation from the one to one correspondence is given to the relation between the memory address and the input TV signal address, a linearly shifted CRT screen image is stored in memory 21. If writing in a specific range of the memory address or input TV signal address is permitted, a partial rewritting is made.

In a synchronizing separating portion included in write control circuit 23, a horizontal synchronizing signal and a vertical synchronizing signal are drawn from input second TV signal B. At the same time, field discrimination (even number/uneven number) and protection against abnormal synchronizing signal may be performed.

Read control portion 24 controls the relation between a two-dimensional address of the synchronizing signal for the output signal and that of memory 21 and, at the same time, controls the flow of data from the memory 21. In doing so, read control portion 24 generates address codes and command codes for memory 21. The memory address and the output address normally have the relation of one-to-one correspondence. However, this relation can be changed in the same manner as described above for write control circuit 23. Read control portion 24 includes a synchronizing separating portion similarly to write control circuit 23.

Identification signal generating circuit 25 inserts an identification signal into second TV signal B during the recording. The identification signal has any suitable form, such as having a predetermined frequency of a specific code and disposed between a pedestal level and a white level, in a horizontal effective period except a horizontal blanking period, included in a period of about 12H ranged from a vertical synchronizing signal and an equalizing pulse period to an effective horozontal scanning line. In other words, the identification signal is defined in a category of composite video signals.

Accordingly, a method requiring change/addition of a recording format, for example, a method of superposing an identification carrier on a frequency-modulated recording signal carrier in the VTR portion is avoided. If second TV signal B alone is continued, the function of the present invention can be utilized in combination with the conventional VTR.

Since the identification signal is inserted before the mixing of first and second TV signals A and B, the reliability of detecting the identification signal during the reproducing is improved, and the range of memory control timing for the separating operation can be widened. If the identification signal used has a predetermined frequency, a detection error will easily occur if the original video signal contains a large quantity of substantially the same frequency.

In general, the video signal can be detected continuously because the correlation of the fields is very high. Since the identification signal of the present invention is inserted for every other field, the detection error is effectively eliminated on the basis of the detection pattern thereof. Because the identification signal is inserted by D/A conversion encode circuit 22, the output of D/A conversion encode circuit 22 exists in the selected field, which is the field for the second program, as the output of output switch 18. Accordingly, discrimination between the first and second programs can be made during the reproducing.

Mixed signal C sent out from output switch 18 is recorded on video tape 8 by tape head 4 of mechanical system 3 through the signal processing circuit 2 as shown in FIG. 5. Control circuit 19 has a reserve input portion 28, a reserve control portion 29 for measuring time and for controlling recording time by the reserved contents and time, and a video memory control portion 30 for controlling the function of video memory circuit 17. Some parts of control circuit 19 may be integrated into operation circuit 5, timer circuit 6 and system controller 7 shown in FIG. 5.

Recording operations according to the aforesaid embodiments of the present invention will be described in reference to FIGS. 7 and 8.

Assume that first and second TV tuners 9 and 10 shown in FIG. 6 are reserved to receive arbitrary reception channels, for example, TV ch 1 and bilingual BS ch 13 respectively. The reception channels are preset by a suitable method and designated by controlling the selection of the TV stations.

Reserve control portion 29 shown in FIG. 6 stores reserved input information, compares it with measured time, and generates corresponding instructions at a recording start time. Simultaneous execution of reserved video recording for two or more programs is permitted. If the start/end of the recording operation and of the multiple recording in the VTR occur simultaneously, in other words, if the recording start time/recording end time of one reserved program is equal to that of another reserved program, the recording of both of the reserved programs can be started/finished simultaneously.

However, if the recording of one reserved program is started and finished while the recording of another is executed, some problems arise that will require a special consideration to secure stable and reliable reproduction.

In the following, examples of the operation timing are described in two situations where a multiple video recording with the aforesaid time mismatch is started and executed, and where the execution of the multiple video recording is finished and then shifted to a single video recording.

Figure 7:
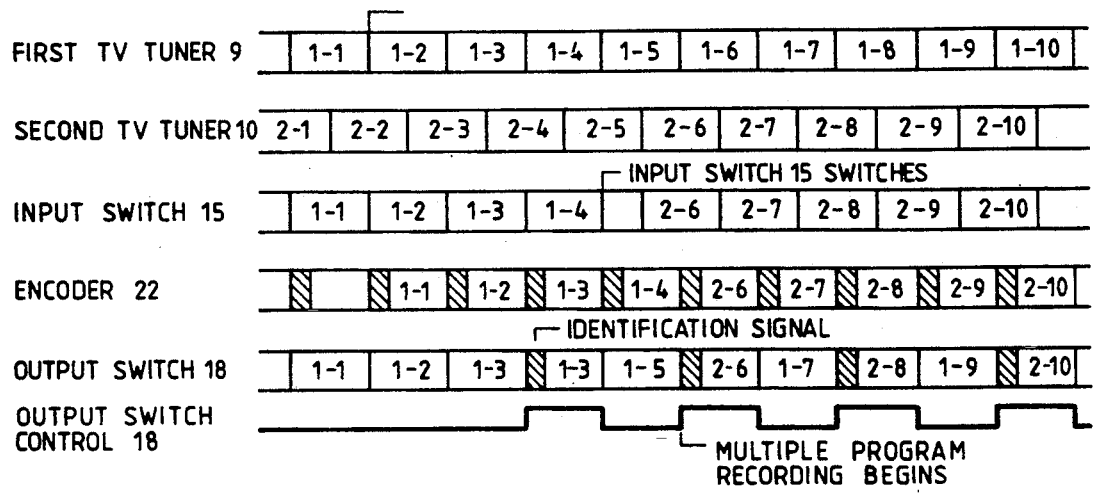
FIGS. 7 and 8 are timing charts relating to the recording operation of FIG. 5.

First, the operation in the start of the multiple recording is described in reference to FIG. 7. It is now assumed that the first program from first TV tuner 9 is selected by input switch 14 after the first reserved time and further selected by output switch 18 to feed the first program to mechanical system 3 and tape head 4 shown in FIG. 1 for video recording, which is in general a single video recording.

Input switch 15 selects first TV tuner 9 so that a write-enable WE signal of memory 21 is in an "enable" state. Furthermore, the reading is limited by the signal of first TV tuner 9, so that the signal of first TV tuner 9 delayed by one field is sent out as the output of D/A conversion and encode circuit 22 but is not selected as a recording signal. During the recording, an identification signal is inserted into the output of D/A conversion and encode circuit 22.

It is now assumed that the start time for the second reserved video recording from second TV tuner 10 occurs while the first reserved video recording is executed. With an instruction of the multiple video recording given by reserved control portion 29 shown in FIG. 6, output switch 18 is inverted for each field after the timing (1–4) of first TV tuner 9, by which the signal of first TV tuner 9 and the output signal of memory 21 synchronized with the signal of first TV tuner 9 are alternately switched for each field to be used as a recording signal. Switching operation is carried out in a period (6H) including a vertical synchronizing signal and following equalizing pulses.

Input switch 15 is switched in the field next to the first inversion of control circuit 19, so that the memory write enable signal is switched to the second TV tuner 10 side. The phase of the synchronizing signal in second TV tuner 10 is different from that in first TV tuner 9. If a signal (2–6) of second TV tuner is written normally, signal (2–6) next to a signal (1–5) is sent out as the output of output switch 18 so that the multiple recording starts.

Figure 8:
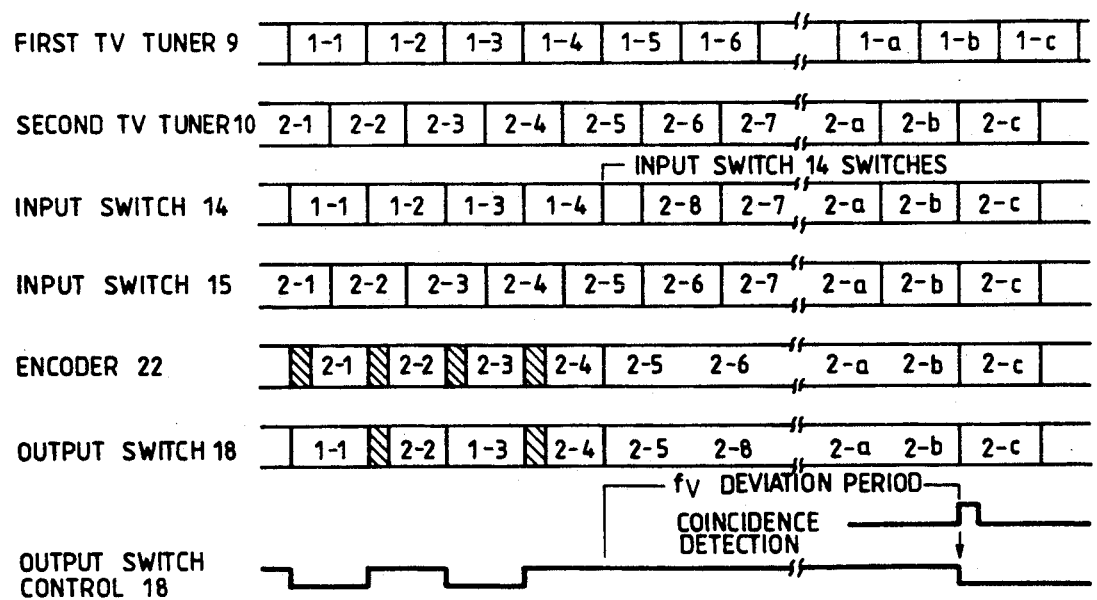

The operation in the situation where the multiple recording is shifted to the single recording of the second program is described in reference to FIG. 8.

If the recording of the second program is started during the recording of the first program and finished before the end of the recording of the first program, the switching operation of output switch 18 for each field is stopped, which is, output switch 18 is fixed to the first program side and input switch 15 is returned to the original position.

However, if the recording of the first program is finished before the end of the recording of the second program, the procedure of fixing output switch 18 continuously to the second program side produces a problem.

When the multiple video recording of the third program is started during the single video recording of the second program, the third program selected by TV tuner 9 changes the phase of the synchronizing signal for controlling the reading from memory 21, so that the servo of mechanical system 3 performs a pull-in operation again, thus leaving the recording on the tape disarranged. Further, since the second program is recorded from memory 21 despite the single recording of the second program, the picture quality deteriorates. To eliminate this problem, a signal path of the second program is switched from the path dependent on memory 21 to an independent path without disturbing the VTR servo as shown in FIG. 8.

In FIG. 8, the multiple recording period is continued up to (1-4) of the first TV tuner 9 timing. After that, the recording of the first program is stopped. At (1-5), input switch 14 is switched to the second TV tuner 10 side and output switch 18 is fixed to the second TV turner 10 side which is the output of D/A and encoder 22.

Assume that the period between (1-5) and the detection of coincidence be $f_v$ deviation period. During the $f_v$ deviation period, a slight deviation is given to the vertical synchronizing signal frequency of the video signal read from memory 21 while the second program is continuously recorded from memory 21 until the phase of the vertical synchronizing signal of the video signal coincides with the phase of the write-side vertical synchronizing signal (the input signal of the second program). When the end time of the first program occurs, control circuit 19 gives instructions of $f_v$ deviation. In the instructions, read control portion 24 is established to be free (free-running state) from the phase synchronization due to the output video signal of input switch 14 and, at the same time, gives a slight deviation to the vertical synchronizing signal frequency. There is no need to change the horizontal synchronizing signal frequency.

As a practical example, the horizontal synchronizing signal frequency is established to be constant and the vertical synchronizing signal cycle is established to be 260H, being slightly different from the original vertical synchronizing signal cycle of 262.5H. The method for realizing it can be selected arbitrarily.

In this example, the vertical synchronizing signal frequency is increased by about 1%. Accordingly, the read signal operates relative to the write signal from second TV tuner 10 to decrease the phase difference or delay between the vertical synchronizing signals thereof, so that the phases of the vertical synchronizing signals coincide with each other. After that, the read signal is returned to a one-field delayed state. On the basis of the phase coincidence signal from coincidence detecting circuit 26, output switch 18 is switched over to the first TV tuner 10 side and, at the same time, the $f_v$ deviation period is finished.

The length of the $f_v$ deviation period is changed corresponding to the phase difference between the vertical synchronizing signals at the starting point of the $f_v$ deviation period. Because the phase difference of one field is corrected by 2.5H per field, the length of the $f_v$ deviation period is no more than 1.8 sec.

$$262.5/5 = 105 \text{ field}$$

$$105/60 = 1.8 \text{ sec}$$

At the starting point of the $f_v$ deviation period, the free-running state is caused by a deviation given to the vertical synchronizing signal cycle. At the ending point thereof, the signal of second TV tuner 10 having the phase coincidence between the vertical synchronizing signals is selected. Accordingly, the phase of the vertical synchronizing signal in the recording signal is not jumped, and, the VTR recording servo is not disturbed.

The deviation of the vertical synchronizing signal frequency of about 1% has little adverse effect on the VTR recording servo. Further, even if the multiple recording is switched to the single recording, the period dependent on memory 21 is no more than 1.8 sec. Accordingly, the period in which the picture quality is somewhat deteriorated by the unnecessary use of memory 21 is negligible. Further, in the situation where the aforementioned treatment is carried out, and when the multiple video recording for the third program starts in the single recording of the second program the multiple video recording can be carried out in the same manner as described above in reference to FIGS. 7 and 8.

As described above, mixed signal C comprising first and second TV signals A and B is recorded on video tape 8 through tape head 4 of mechanical system 3.

Mixed recording and separation reproducing according to the present invention will be described in reference to FIGS. 9-11.

As described above, mixing/separating circuit is provided as a single circuit which operates reversibly between the mixed recording and separated reproducing. Like parts in FIGS. 6 and 9 are referenced with same reference numerals.

Figure 9:
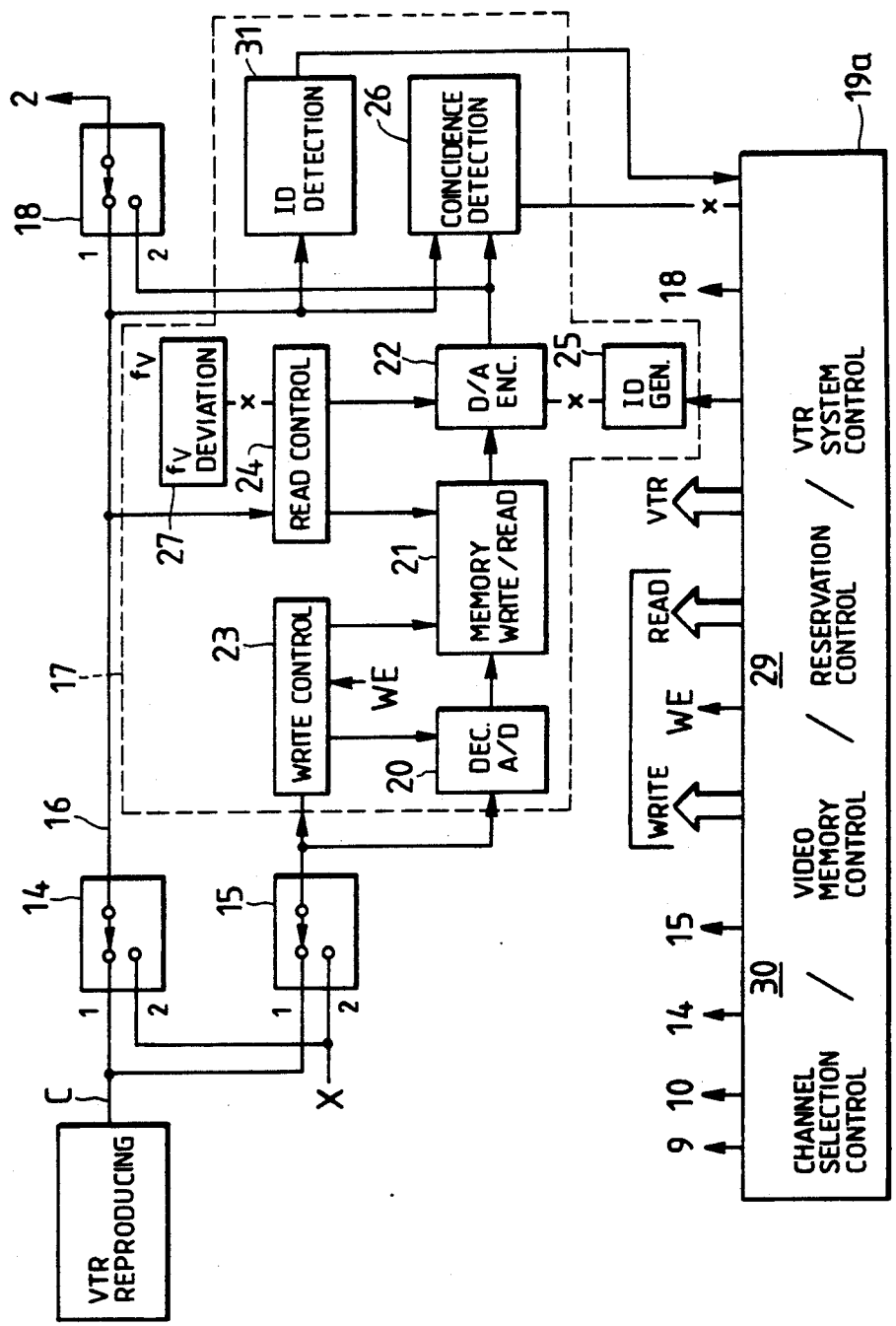
FIG. 9 is a schematic diagram of a mixing/separating circuit of FIG. 5 during reproducing.

In FIG. 9, mixed signal C, instead of input TV signals A and B shown in FIG. 6, is fed to mixing/separating circuit after a changeover portion (not shown) selects mixed signal C. Further, input switches 14 and 15 select the received mixed signal C. $f_v$ deviation circuit 27, identification signal generating circuit 25 and coincidence detecting circuit 26 of FIG. 6 are not operational in FIG. 9. An identification signal detecting portion 31 is newly provided in FIG. 9. A detection signal is transmitted to control circuit 19a. Write-enable signal WE is a control signal for permitting the writing or updating of digital data into memory 21. When the level of write-enable signal WE is low, the writing is not permitted. WE may be a real signal or an unreal signal such as an instruction code if such unreal signal can substantially indicate the same operation.

Reproducing according to the present invention will be described in reference to FIGS. 10 and 11.

Figure 10:
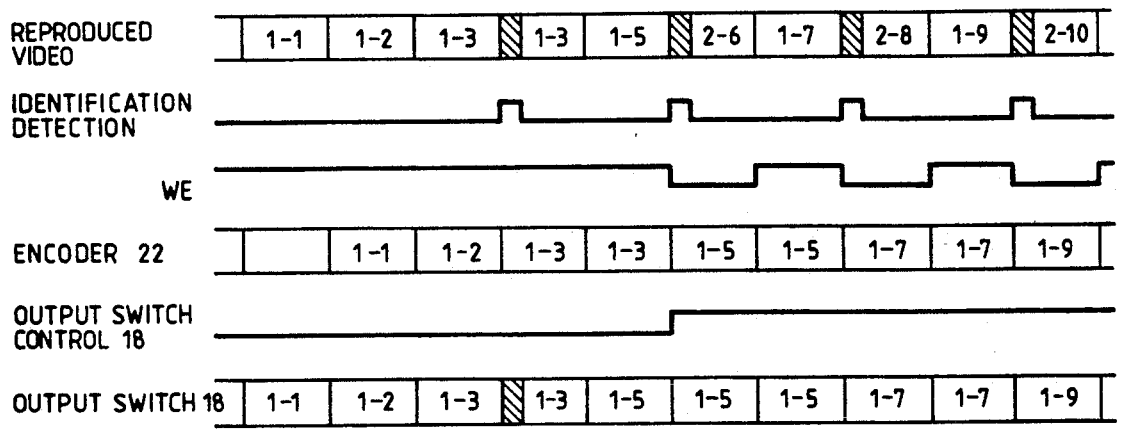
FIGS. 10 and 11 are timing charts relating to the reproducing operation of FIG. 5.

FIG. 10 shows an example of the reproducing at the start point of a multiple recording. The start point of the multiple recording is the same as in the recording signal which is the output of output switch 18 shown in FIG. 7.

In general, during the reproducing, the writing/reading of memory 21 is carried out while the input signal is sent out from output switch 18 fixed to the first program side as it is received by the input switch. When the synchronization in the read side is carried out by the input video signal as shown in FIG. 10, the stability of the television screen is improved against shifting between one state that the memory is used and another state that the memory is not used.

When the multiple recording occurs during the reproducing of the first program, the identification signal is first detected. When the identification signal is not detected in the next field after the first detection thereof, it is recognized that the aforementioned signal is not caused by the detection error of the video signal but is a true identification signal for multiple recording. On this recognition, write-enable signal WE after a reproducing video timing (2-6) is inverted for each field and, at the same time, output switch 18 is fixed to the second program side.

The inversion of WE is established so that the level of WE is low in the field of containing the identification signal. The result of detecting the identification signal is continuously monitored, so that the multiple recording period is recognized while the identification signal is detected for each field.

By the aforementioned operation, the field of the first program written for every other field is reproduced twice although the second program is fed for every other field, because the field of the second program is not written in memory 21. Accordingly, although the multiple recording portion for the second program comes during the reproducing of the single recorded portion of the first program, the first program can be securely selectively reproduced while the situation is shifted to the separation reproducing using memory 21.

Figure 11:
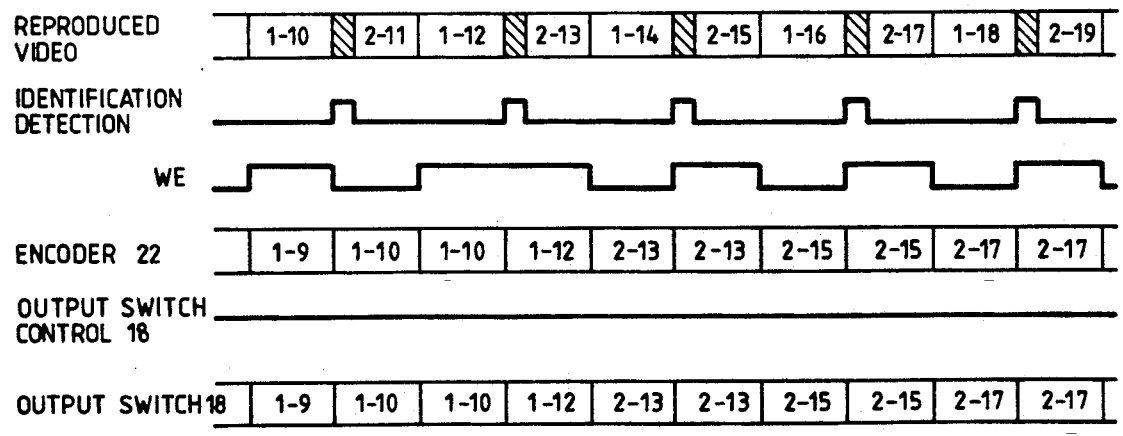

FIG. 11 shows a method for switching the program to be separated and reproduced. Although the first program should be continuously reproduced at the start point of the multiple recording portion as described above, the operation for selecting the second program, or the operation of switching suitably between the first and the second programs is permitted in the multiple recording portion.

As shown in FIG. 11, the reproducing method includes the step of inverting the phase of write-enable signal WE relative to the field containing the identification signal. Because the field sequence of reproducing signals, which is the field of the program which has been recorded and the field of the multiple recording program, can be recognized through the recognition of the identification signal, the writing is permitted in the field period of the program to be selected.

During the separation reproducing, the video signal written in memory 21 for every other field is read repeatedly by two fields from memory 21. Accordingly, deterioration of the picture quality is observed. In particular, when the movement of the video picture is very rapid, the picture may flicker. However, compared with the conventional VTR where two programs cannot be recorded simultaneously, the present invention provides a substantial advantage in that the recording time of the tape can be substantially doubled, doubling the capacity of a VTR.

As shown in FIG. 9, any suitable one of first and second TV signal A and B is selected by output switch 18 from mixed signal C recorded on video tape 8 and then sent from signal processing circuit 2 to the display unit (CRT).

Recording/reproducing of audio signals will be described hereinafter.

As shown in FIG. 5, tape head 4 must have at least two audio channels. In a generally used ½ inch cassette VTR represented by VHS, two audio recording channels by means of FM (frequency modulation) are added to conventional fixed head (alternating-current bias) recording channels. In the viewpoint of audio quality, FM audio channels are used for audio recording in the embodiments of the present invention.

In the case where the audio outputs of first and second TV tuners 9 and 10 are monaural, left (L) and right (R) output, and main aural output are selected corresponding to stereo and bilingual broadcastings, respectively. Accordingly, in the multiple recording, audio signals of the first and second programs are recorded in left and right FM audio channels, respectively, so that any suitable one of the FM audio channels is selected corresponding to selected video signals during reproducing.

In the case where the audio outputs of first and second TV tuners 9 and 10 are stereo/bilingual, suitable one or ones are selected from L (main), R (sub) and (L+R) on the basis of an audio mode identification signal (monaural/stereo/bilingual) from respective TV tuners, where L represents the audio output of one tuner, R represents the audio output of another tuner, and (L+R) represents the audio output of both tuners. In otherwords any one of these three, L, R, and L+R, in the case of monaural mode, (L+R) in the case of stereo mode, and the main aural sound in the case of bilingual mode are recorded in the audio channels assigned to each TV program.

During the reproducing, reproducing signals of the audio channels of the selected programs is fed to L output, R output and (L+R) output.

As described above, according to the present invention, a multiple number of received TV programs simultaneously can be recorded on one recording medium as a single signal and subsequently separated and reproduced.

By identifying the single recording portion and the multiple recording portion on the basis of the identification signal, the multiple number of programs can be discriminated from each other. Because the identification signal is incorporated in the recording video signal itself, tape head 4 and memory 21 are connected to one another through the video signal. Because the insertion of the identification signals starts before the multiple recording starts, detection/recognition/memory control can be carried out securely.

When the single recording portion and the multiple recording portion are successively reproduced, the single portion is selected and separated from the multiple recording portion, so that it is possible to enjoy the video regardless of the multiple recording portion. During the reproducing of the multiple recording portion, any suitable one of the multiple number of programs can be selected.

The audio signals of the first and second programs are recorded in the two audio channels by tape head 4, so that one of the two audio sound channels can be selected corresponding to the program selection during the reproducing. When the audio mode is stereo, (L+R) is selected and recorded in the audio channels. When the audio mode is billingual, the main sound is selected and recorded in the audio channels. Consequently, the sound corresponding to the selected program to be reproduced can be selected and reproduced.

Although the aforementioned embodiments of the present invention a single circuit functioning as a mixing circuit as well as a separating circuit, the present invention is not limited to this specific circuit arrangement.

Figure 12:
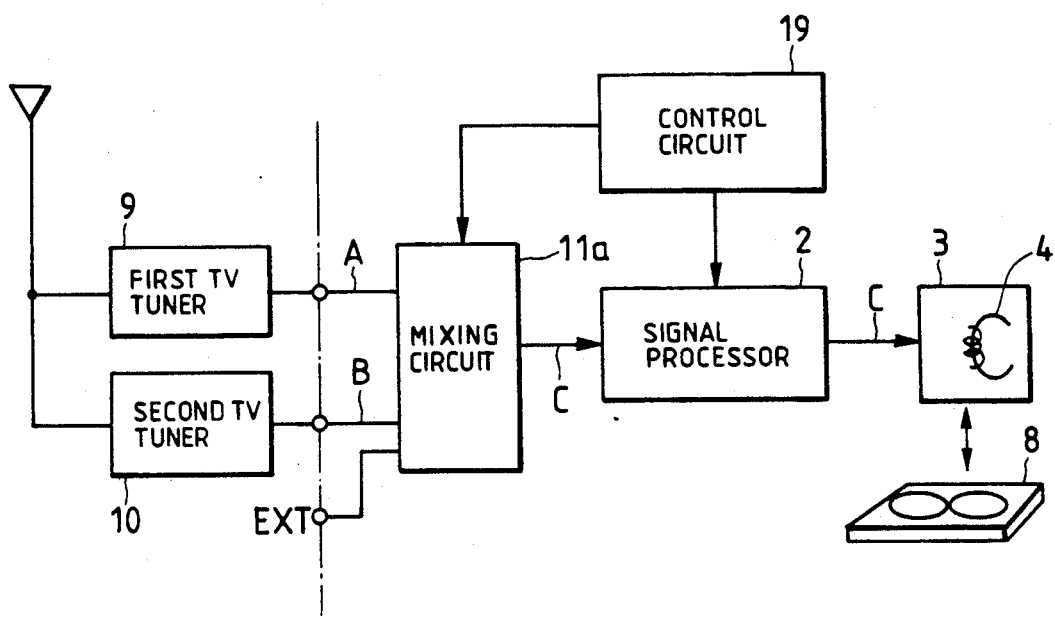
FIG. 12 is a schematic diagram of a VTR having a mixing circuit according to the present invention.
Figure 13:
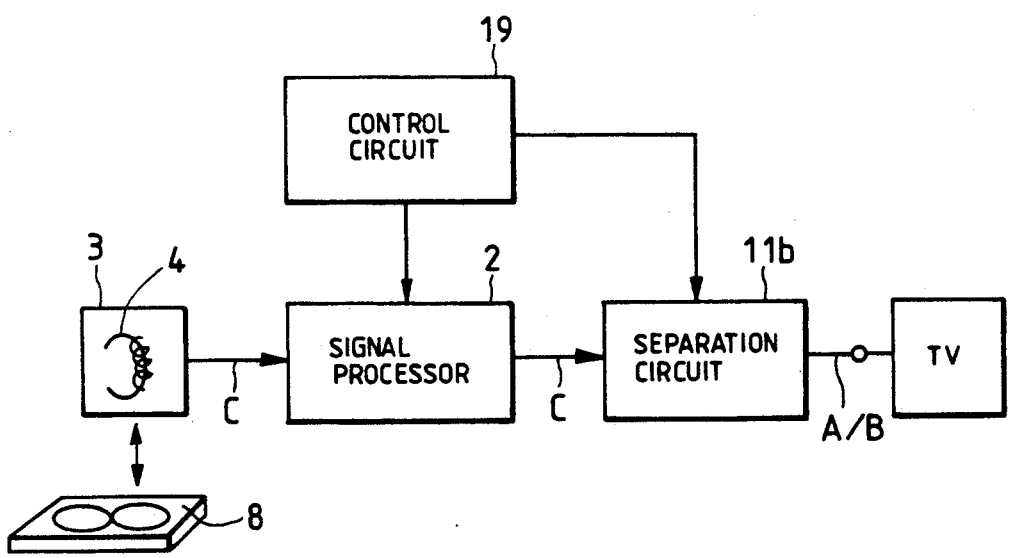
FIG. 13 is a schematic diagram of a VTR having a separating circuit according to the present invention.
Figure 14:
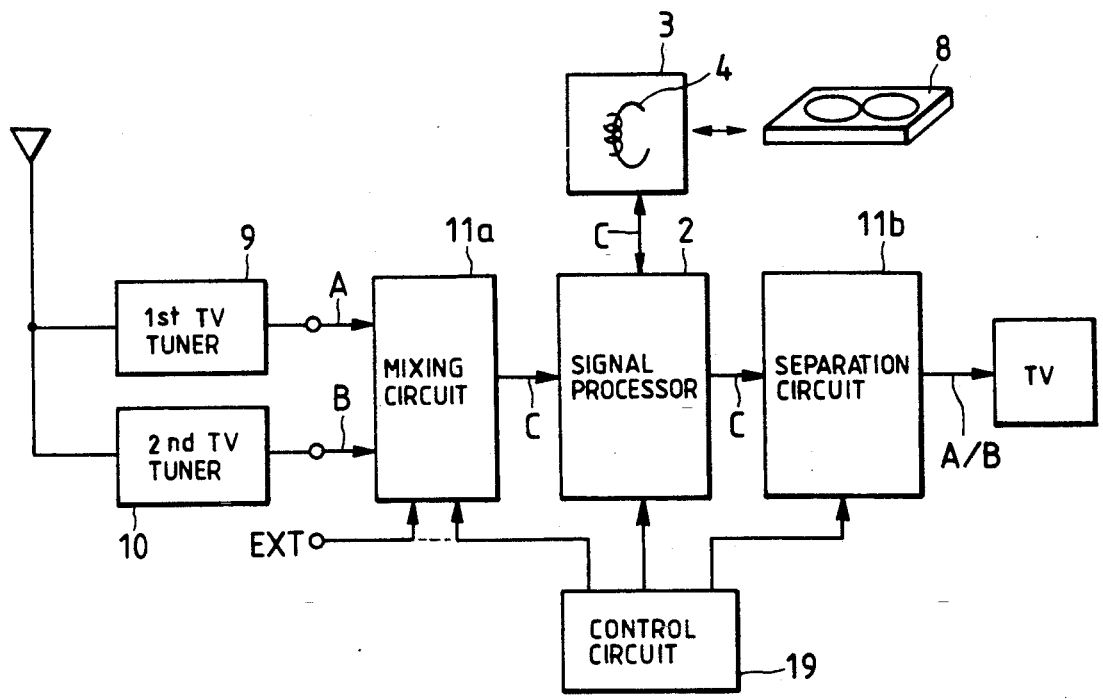
FIG. 14 is a schematic diagram of a VTR separately having both mixing and separating circuits according to the present invention.

The present invention is also applicable to the VTR including only a mixing circuit 11a as shown in FIG. 12. Further, alternatively, the present invention is applicable to a read-only VTR including a separation reproducing circuit 11b as shown in FIG. 13. Further, alternatively, the present invention is applicable to the VTR having both mixing circuit 11a and separation reproducing circuit 11b separately as shown in FIG. 14. The arrangement of the respective parts will be understood from the above description.

Figure 15:
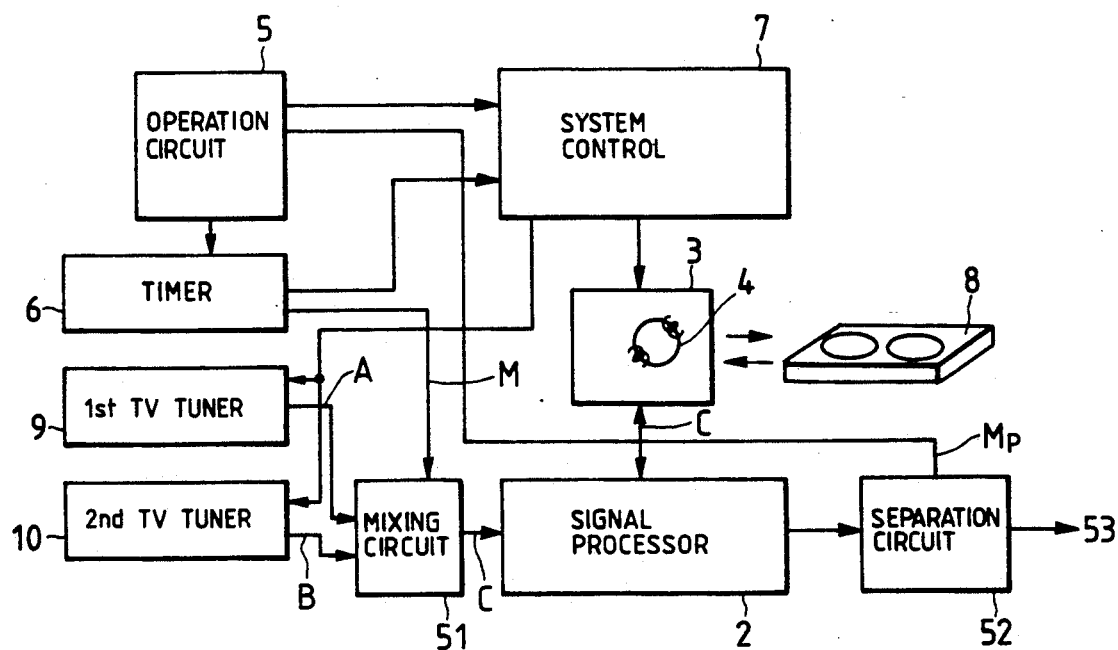
FIG. 15 is a schematic diagram of a VTR according to the fifth and sixth embodiments of the present invention.

FIG. 15 is a schematic diagram of a VTR in accordance with fifth and sixth embodiments of the present invention.

The schematic shown in FIG. 15 of the present invention distinguish over the schematic in FIG. 1 of the prior art as follows. Like parts are referenced with like reference numerals in FIG. 15 and FIG. 1.

First, in FIG. 15, two tuners, first and second TV tuners 9 and 10, are provided. More than two tuners can be provided in practice. Second, in FIG. 15, mixing circuit 51 is provided between signal processing circuit 2, and first and second TV tuners 9 and 10. Third, in FIG. 15, separating circuit 52 is provided between signal processing circuit 2 and a reproducing output terminal 53. Additional further distinguishing points will be pointed out hereinafter.

In FIG. 15, TV tuners 9 and 10 may be included inside the VTR or outside. First and second TV tuners 9 and 10 perform tuning operation individually. Mixing circuit 51 mixes first and second TV signals A and B respectively, fed from first and second TV tunes 9 and 10 respectively, by means which will be described later, whereby mixed signal C is formed to be fed to signal processing circuit 2. Mixing circuit 51 mixes first and second TV signals A and B on the basis of a multiple recording mode signal M generated from timer circuit 6. In other modes, any suitable one of the TV tuners or corresponding first and second TV signals A and B from mixing circuit 51 is passed through signal processing circuit 2.

Separating circuit 52 receives mixed signal C from signal processing circuit 2, separates signals from mixed signal C by means which will be described later, and sends out the separated signals via terminal 53. Separating circuit 52 performs the separating on the basis of multiple recording mode signal M generated from timer circuit 6. In other modes, the signal from signal processing circuit 2 is passed through without separation thereof.

In the aforementioned arrangement, various mixing/separating methods are used in mixing circuit 51 and separating circuit 52. In the following, the fifth and sixth embodiments of the present invention with respect to the mixing/separating will be described.

Figure 16:
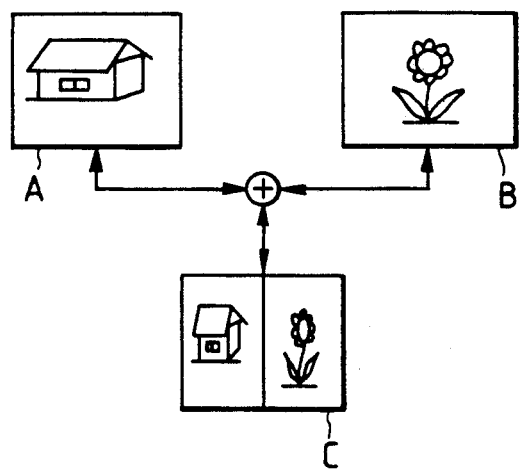
FIG. 16 is a concept illustration of the principle of mixing and separation according to the fifth embodiment of the present invention.

First, the fifth embodiment of the present invention will be described. FIG. 16 shows the principle of the mixing/separating of the TV signals according to the fifth embodiment. In FIG. 16, during the recording, first and second TV signals A and B respectively are independently stored in the form of a mixed signal C as if the screen is divided into left and right sections with respective first and second TV signals and during the reproducing, one of first and second TV signal A and B is separated, by reading TV signals A and B selectively, from mixed signal C. In other words, the fifth embodiment of the present invention employs a compression of mixing and expansion of separating method.

A mixing circuit 111 is shown in FIG. 17. Mixing circuit 111 is included in the video signal system. The corresponding audio signal system will be described later.

In FIG. 17, mixing circuit 111 has a write processing circuit 54 for a first TV signal A, a write processing circuit 55 for second TV signal B, a clock generator 56, a memory 57, a read processing circuit 58 for mixed signal C and a changeover switch 59.

Write processing circuit 54 for first TV signal A has a horizontal synchronizing signal separating circuit 60 for separating a horizontal synchronizing signal $H_A$ from first TV signal A, a vertical synchronizing signal separating circuit 61 for separating a vertical synchronizing signal $V_A$ from first TV signal A, an A/D converter 62 for converting the video signal of first TV signal A into a digital signal $V_{DA}$, an X-address counter 63 for transforming horizontal synchronizing signal $H_A$ into a X-address signal $X_A$, and a Y-address counter 64 for transforming vertical synchronizing signal $V_A$ into a Y-address signal $Y_A$, and a write circuit 65 for writing a recording signal $D_A$ for first TV signal A in memory 57.

A write processing circuit 55 for second TV signal B has a horizontal synchronizing signal separating circuit 66 for separating a horizontal synchronizing signal $H_B$ from second TV signal B, a vertical synchronizing signal separating circuit 67 for separating a vertical synchronizing signal $V_B$ from second TV signal B, an A/D converter for converting the video signal of second TV signal B into a digital signal $V_{DB}$, and an X-address counter 69 for transforming horizontal synchronizing signal $H_B$ into an X-address signal $X_B$, a Y-address counter 70 for transforming vertical synchronizing signal $V_B$ into a Y-address signal $Y_B$, and a write circuit 71 for writing a recording signal $D_B$ for second TV signal B in memory 57.

Read processing circuit 58 for mixed signal C has a read circuit 72 for reading mixed signal C from memory 57, an X-address counter 73 and a Y-address counter 74 for generating X- and Y-read address signals $X_C$ and $Y_C$ respectively for memory 57, and a D/A converter 75 for converting mixed signal C into an analog signal.

Changeover switch 59 sends out one of first and second TV signals A and B of mixed signal C from D/A converter 75. Switching control of changeover switch 59 is based on multiple recording mode signal M generated from timer circuit 6 shown in FIG. 15.

Figure 18:
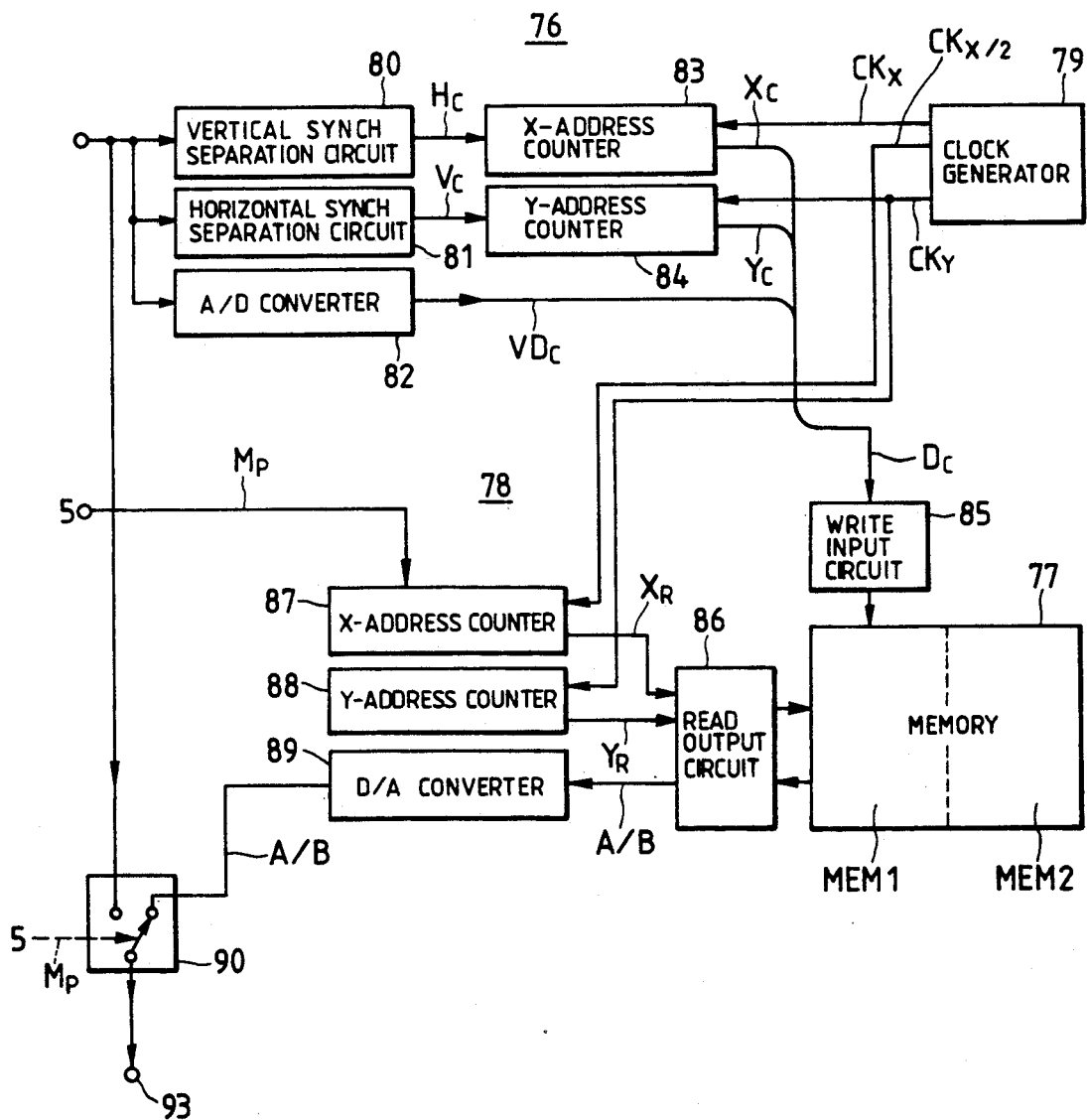
FIG. 18 is a schematic diagram of a separating circuit according to the fifth embodiment.

A separating circuit 112 is shown in FIG. 18. Similar to mixing circuit 111 shown in FIG. 17, separating circuit 112 is included in the video signal system. The corresponding audio signal system will be described later.

In FIG. 18, separating circuit 112 has a write processing circuit 76 for mixed signal C reproduced from the VTR, a memory 77, a read processing circuit 78, and a clock generator 79.

Write processing circuit 76 has a horizontal synchronizing signal separating circuit 80 for separating a horizontal synchronizing signal $H_C$ from mixed signal C reproduced from the VTR, a vertical synchronizing signal separating circuit 81 for separating a vertical synchronizing signal $V_C$ from mixed signal C, an A/D converter 82 for converting the video signal of mixed signal C into a digital signal $V_{DC}$, an X-address counter 83 for transforming horizontal synchronizing signal $H_C$ into an X-address signal $X_C$, a Y-address counter 84 for transforming vertical synchronizing signal $V_C$ into a Y-address signal $Y_C$, and a write circuit 85 for writing a mixed recording signal $D_C$ in memory 57.

Figure 19:
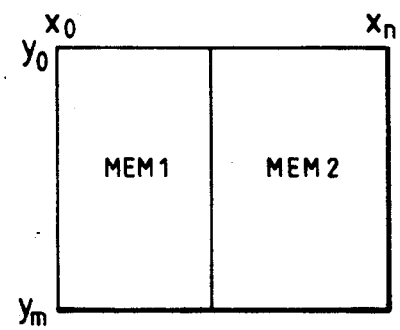
FIG. 19 is a concept illustration dividing the storage area of a memory relating to FIG. 17.

The storage area of memory 77 is divided into two sections MEM$_1$ and MEM$_2$ as shown in FIG. 19. MEM$_1$ stores first TV signal A. MEM$_2$ stores second TV signal B, forming mixed signal C in memory 77. Discrimination between MEM$_1$ and MEM$_2$ is made by addressing on the basis of X-address signals $X_A$ and $X_B$ contained in corresponding recording signals $D_A$ and $D_B$.

Read processing circuit 78 has a read circuit 88 for reading first or second TV signal A or B from memory 77, and an X-address counter 87 for generating an X-address signal $X_R$ for reading from memory 77 corresponding to the contents designated by a multiple recording mode signal $M_p$ from operation circuit 5, a Y-address counter 88 for generating a Y-address signal $Y_R$ in the same manner, and a D/A converter 89 for converting first or second TV signal A or B read from memory 77 into an analog signal.

Changeover switch 90 send out either one of converted first and second TV signal A and B or mixed signal C. The switching control of changeover switch 90 is based on multiple recording mode signal $M_p$ fed from operation circuit 5.

In the following, the operation of the fifth embodiment of the present invention will be described.

First, the recording operation will be described in reference to FIG. 17. During the multiple recording, multiple recording mode signal M from timer circuit 6 is fed to mixing circuit 111, so that the VTR is set in a multiple recording mode.

When the stations are selected by first and second TV tuners 9 and 10, corresponding first and second TV signals A and B are fed to mixing circuit 111. In mixing circuit 111, write processing circuits 54 and 55 generate recording signals $D_A$ and $D_B$ on the basis of X-clock $CK_{X/2}$ and Y-clock $CK_y$ generated by clock generator 56.

In write processing circuit 54, horizontal synchronizing signal $H_A$ is separated by horizontal synchronizing signal separating circuit 60 and then fed to X-address counter 63. A vertical synchronizing signal separating circuit 61 separates vertical synchronizing signal $V_A$ and then feeds it to Y-address counter 64. X-clock $CK_{X/2}$ from clock genrator 56 is fed to X-address counter 63, and Y-clock $CK_y$ to Y-address counter 64.

X-clock $CK_{X/2}$ has a frequency which is half the frequency of a clock signal $CK_X$ obtained by multiplying the frequency of horizontal synchronizing signal $H_A$ by n. Y-clock $CK_y$ is a frequency obtained by multiplying the frequency of vertical synchronizing signal $V_A$ by m. Horizontal synchronizing signal $H_A$ serves as a reset signal for X-address counter 63. Accordingly, X-address counter 63 is reset whenever horizontal synchronizing signal $H_A$ occurs, so that X-address counter 63 performs counting up the the value of n/2 in one horizontal synchronizing signal cycle $T_{HA}$. This signal is sent out as X-addrress signal $X_A$.

Similarly, vertical synchronizing signal $V_A$ serves as a reset signal for Y-address counter 64. Accordingly, Y-address counter 64 is reset whenever vertical synchronizing signal $V_A$ occurs, so that Y-address counter 64 counts up to the value of m in one vetical synchronizing signal $T_{VA}$. This signal is sent out as Y-address signal $Y_A$. Accordingly, on the basis of X-address signal $X_A$ and signal $Y_A$, write circuit 65 writes $V_{DA}$ in storage area MEM$_1$ which corresponds to the left half section of the storage area of memory 57 and which is specified by X-addresses $X_0$–$X_{n/2}$ and Y-addresses $Y_0$–$Y_m$.

Thus, data corresponding to first and second TV signals A and B are stored in MEM$_1$ and MEM$_2$ of memory 57, respectively. As a whole, first and second TV signals A and B are stored in memory 57 as if they are mixed.

Mixed signal C, comprising recording signals $D_A$ and $D_B$, which has been written in memory 57 is read from memory 57 through read circuit 72 on the basis of read X-address signal $X_R$ and read Y-address signal $Y_R$ generated from X-address counter 73 and Y-address counter 74 on the basis of X-clock $CK_X$ and Y-clock $CK_y$. Read mixed signal C is converted into an analog signal by D/A converter 75, so that analog converted mixed signal C is fed to changeover switch 59. A corresponding image of mixed signal C at that time is shown in FIG. 16.

At that time, changeover switch 59 is fixed to a contact state as shown in FIG. 17 on the basis of multiple recording mode signal M which comes from timer circuit 6. Accordingly, mixed signal C is fed to output terminal 91. Then, mixed signal C is fed to signal processing circuit 2 shown in FIG. 15, for signal processing to actuate tape head 4. Consequently, mixed signal C is recorded on video tape 8 shown in FIG. 15.

In the following, the reproducing operation of the fifth embodiment of the present invention will be described in reference to FIG. 18. During the reproducing of multiple recorded mixed signal C, multiple recording mode signal $M_p$ is given to separating circuit 112 from operation circuit 5, so that the VTR is set in the reproducing mode. Mixed signal C, reproduced from video tape 8 through tape head 4 shown in FIG. 15, is fed to separating circuit 112 through signal processing circuit 2.

In separating circuit 112, write processing circuit 76 generates combined recording signal $D_C$ on the basis of X-clock $CK_X$ and Y-clock $CK_y$ generated by clock generator 79 and writes it in memory 77. Similarly, memory 77 selectively reads one of first and second TV signals A and B from combined recording signal $D_C$ on the basis of X-clock $CK_X$ and Y-clock $CK_y$ and feeds the selectively read TV signal to changeover switch 90.

In write processing circuit 76, horizontal synchronizing signal $H_C$ is separated from mixed signal C given from signal processing circuit 2 by horizontal synchronizing signal separating circuit 80 and then is fed to X-address counter 83. Similiarly, vertical synchronizing signal $V_C$ is separated from mixed signal C by vertical synchronizing signal separating circuit 82 and then is fed to Y-address counter 88. X-clock $CK_x$ from clock generator 79 is fed to X-address counter 83 and. On the other hand, Y-clock $CK_y$ from clock generator 79 is fed to the Y-address counter 88. A/D converter 82 converts the video signal of mixed signal C into digital signal $V_{DC}$ and sends it out.

X-address counter 83 generates X read address signal $X_C$ for specifying X-addresses $x_o$–$x_n$ of memory 77. Similarly, Y-address counter 84 generates Y read address signal $Y_C$ for specifying Y-address $y_o$–$y_n$. Accordingly, video signal $V_{DC}$ is written into the entire stoage area of memory 77 on the basis of X read address signal $X_C$ and Y read address signal $Y_C$ with no separation.

Then, mixed signal C which has been written in memory 77 is read from memory 77 through read circuit 86 on the basis of X-address signal $X_R$ and Y-address signal $Y_R$ generated from X-address signal $X_R$ and Y-address signal $Y_R$ generated from X-address counter 87 and Y-address counter 88 on the basis of X-clock $CK_X$ and Y-clock $CK_y$. At that time, selection signal $M_p$ from operation circuit 5 is given to X-address counter 87, so that X-address signal $X_R$ in any one of first and second TV signals A and B contained in mixed signal C is selected arbitrarily. This section is carried out on the basis of selection signal $M_p$ given from operation circuit 5 by a VTR operator or user.

When one of first and second TV signal A and B is selected, read circuit 86 reads data of the selected TV signal from memory 77 and then feeds the read data to D/A converter 89. X-clock $CK_{X/2}$ which is given to X-address counter 87 when the data of the selected TV signal is read out from memory 77 has a frequency being half the frequency of X-clock $CK_X$. If selection signal $M_p$ selects first TV signal A, X-address counter 87 will count from the value of 0 to the value of n/2 as X-address signal $X_R$.

If selection signal $M_p$ corresponds to second TV signal B, X-address counter 87 will count from the value of n/2 to n as X-address signal $X_R$. Accordingly, if selection signal $M_p$ corresponds to first TV signal A, data which are read from memory 77 exist in left half section MEM₁ in memory 77. If selection signal $M_p$ corresponds to second TV signal B, data which are read from memory 77 exist in right half section MEM₂ in memory 77. Thus, the data of first and second TV signal A and B are selectively read from memory 77 on basis of selection signal Mp. This is equivalent to separating a selected one of first and second TV signals A and B from mixed signal C.

D/A converter 89 converts the read data of the selected TV signal into an analog signal and then feeds the analog signal to changeover switch 90. At that time, multiple recording mode signal Mp from operation circuit 5 is given to changeover switch 90, so that the selected TV signal is sent out from output terminal 93. Accordingly, the selected TV signal as a separation output signal is fed to the CRT and then produced on the CRT screen.

In the following, the mixing/separation of the audio signal according to the fifth embodiment of the present invention will be described.

Having described the mixing and separating circuit as related to one component (video signal) of the TV signal, it is necessary to mix and separate the other component (audio signal) of the TV signal. In particular, when two or more programs are recorded/reproduced simultaneously, all audio signals incidental to the respective programs must be mixed and separated. In general, a VTR using ½ inch casette tape in a VHS format has audio multiplex recording channels, left (L) and right (R) channels by means of FM (frequency modulation) and record tracks by means of a fixed head (alternating-current bias). In the fifth embodiment of the present invention, the audio multiplex recording channels are used.

For example, audio signals incidental to first and second TV signals A and B are recorded in the left and right channel respectively. During the reproducing, the audio signal to be corresponding to the selected TV signal is selected based on multiple recording mode signal Mp given from operation circuit 5.

According to the fifth embodiment of the present invention as described above, first and second TV signals A and B are assigned to memory sections MEM₁ and MEM₂ of memory 57 respectively by addressing to respective memory sections. During the reproducing, a selected one of first and second TV signals A and B is separated from memory 77 by reading a respective of MEM₁ and MEM₂ by similar addressing.

First and second TV signals A and B written in MEM₁ and MEM₂ respectively are independent from one another. Accordingly, because the signals themselves are not deformed, there is no trouble such as cross-talking or the like. Further, there is no deterioration of picture quality for practical purposes. Consequently, the fifth embodiment of the present invention makes it possible to record a multiple number of programs in a same time slot simultaneously.

The sixth embodiment of the present invention will now be described.

Figure 20:
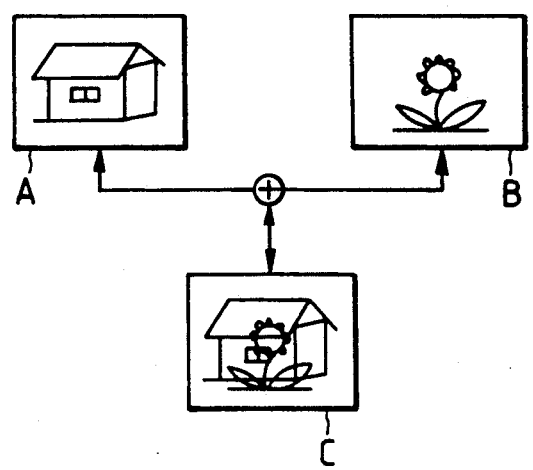
FIG. 20 is a concept illustration of the principle of mixing and separation according to the sixth embodiment of the present invention.

FIG. 20 shows the principle of mixing/separating of TV signals relating to the sixth embodiment. In FIG. 20, during the recording, first and second TV signals A and B are mixed to overlap one another on a screen to form a mixed signal C, and during the reproducing, a selected one of first and second TV signals A and B is separated from mixed signal C.

As described in detail hereafter, the sixth embodiment utilizes interlaced scanning of the CRT screen. In other words, one screen is formed from two signals, first and second TV signals A and B by scanning first and second TV signals A and B alternatively for each field. Like parts in the drawings of the fifth and sixth embodiments are referenced with like reference numerals.

A mixing circuit 151 according to the sixth amendment is shown in FIG. 21. The circuit of FIG. 21 relates to the video signal system. The audio signal system in the sixth embodiment is the same as in the fifth embodiment.

In FIG. 21, the arrangement of mixing circuit 151 is different from the mixing circuit of FIG. 17 corresponding to the fifth embodiment in that mixing circuit 151 in FIG. 21 includes an intermixing circuit 103 for a second TV signal B, a read processing circuit 158 for a mixed signal C, and changeover switches 159 and 104. A write processing circuit 54, a clock generator 56 and a memory 57 are provided in the same manner as in the fifth embodiment.

Intermixing circuit 103 for second TV signal B has a horizontal synchronizing signal separating circuit 96 for separating a horizontal synchronizing signal $H_B$ from second TV signal B, a vertical synchronizing signal separating circuit 97 for separating a vertical synchronizing signal $V_B$ from second TV signal B, and a frequency divider 98 for generating switching signal $S_{VB}$ having a frequency twice the frequency vertical synchronizing signal $V_B$.

Read processing circuit 158 for mixed signal C has an X-address counter 94 for transforming horizontal synchronizing signal $H_B$ into X-address signal $X_B$, and an Y-address counter 95 for transforming vertical synchronizing signal $V_R$ into Y-address signal $Y_R$. A read circuit 72 and a D/A converter 75 in read processing circuit 158 are provided in the same manner as shown in FIG. 17.

A changeover switch 104 selects one of a first analog TV signal A' obtained by D/A conversion of a first TV signal A by D/A converter 75 and second TV signal B. The output of changeover switch 104 is mixed signal C. The changeover operation between first analog TV signal A' and second TV signal B is controlled on the basis of switching signal $S_{VB}$ generated from frequency divider 98.

Changeover switch 159 selects one of first and second TV signals A and B from mixed signal C. The changeover operation is controlled on the basis of multiple recording mode signal $M_p$ fed from operation circuit 5.

Figure 22:
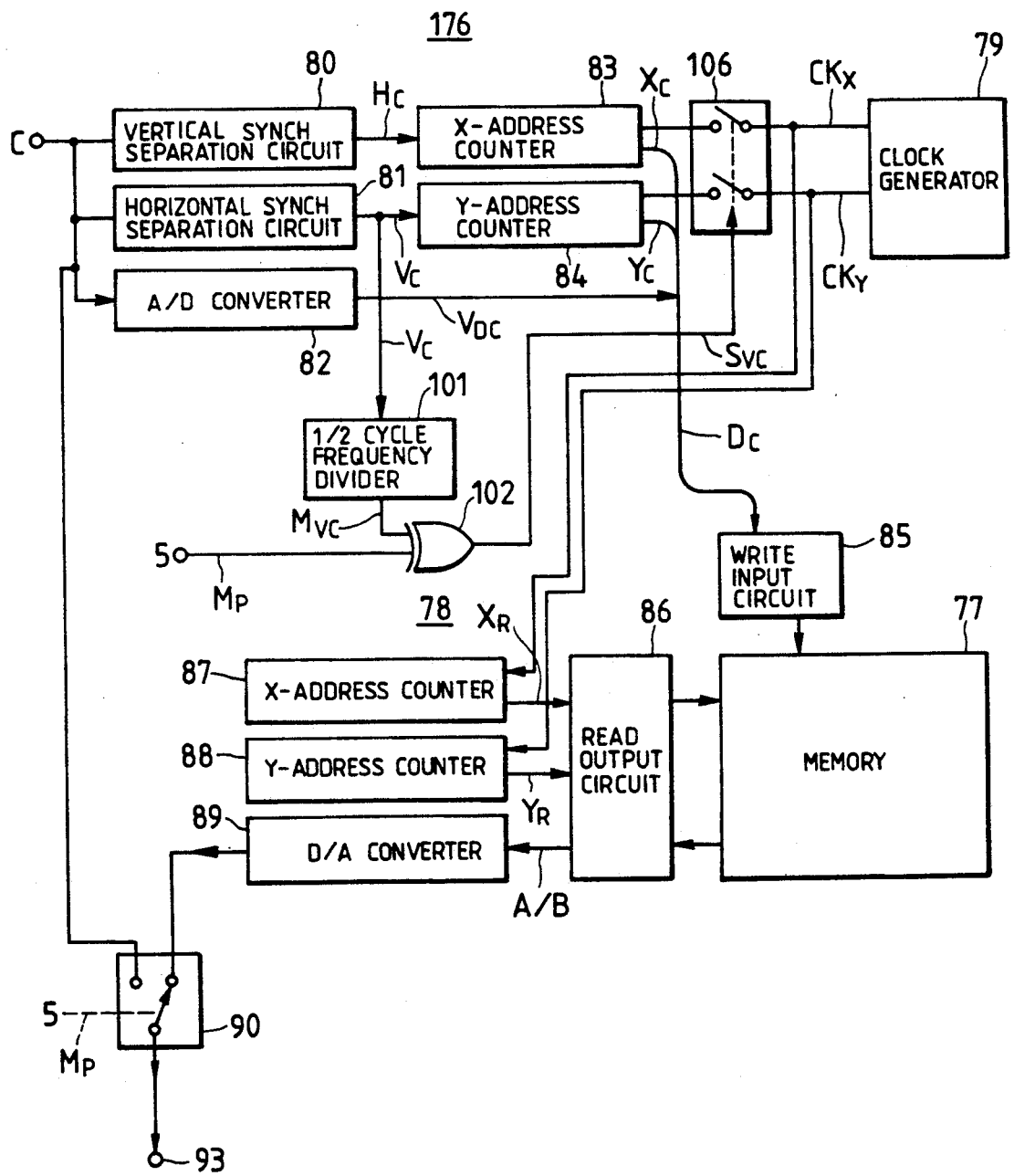
FIG. 22 is a schematic diagram of a separating circuit according to the sixth embodiment.

A separating circuit 152 according to one sixth embodiment of the present invention is shown in FIG. 22. Like FIG. 21, the circuit of FIG. 22 corresponds to the video signal system. The audio signal system in the sixth embodiment is the same as in the fifth embodiment.

In FIG. 22, the arrangement of separating circuit 152 corresponding to the sixth embodiment is different from the separating circuit corresponding to the fifth embodiment in that separating circuit 152 in FIG. 22 includes a write processing circuit 176 and a clock switch 106. A clock generator 79, a memory 77, a read processing circut 78 and a changeover switch 90 are provided in the same manner as in the fifth embodiment shown in FIG. 18.

Write processing circuit 176 has a frequency divider 101 having a frequency twice the frequency of a vertical synchronizing signal $V_C$, an EXOR gate 102 for exclusively ORing a selection signal $M_p$ from an operation circuit 5 and a switching signal $M_{VC}$ from frequency divider 101, and for generating a switching signal $S_{VC}$ as an outlet. A horizontal synchronizing signal separating circuit 80, a vertical synchronizing signal separating circuit 81, an A/D converter 82, an X-address counter 83, an Y-address counter 84 and a write circuit 85 included in write processing circuit 176 are provided in the same manner as in the fifth embodiment shown in FIG. 18.

Clock switch 106 is provided for ON/OFF of the input signals of a X-clock $CK_X$ and a Y-clock $CK_Y$ to X-address counter 83 and Y-address counter 84 on the basis of switching signal $S_{VC}$.

In the following, the operation according to the sixth embodiment will be described.

First, the mixing operation during the recording will be described in reference to FIG. 21. During the multiple recording, multiple recording mode signal M from timer circuit 6 is fed to mixing circuit 151, so that the VTR is set in a multiple recording mode as shown in FIG. 15.

When the stations are selected by first and second TV tuners 9 and 10, corresponding first and second TV signals A and B are fed to mixing circuit 151.

In mixing circuit 151, write processing circuit 54 generates a digital data recording signal $D_A$ as related to first TV signal A on the basis of X-clock $CK_X$ and Y-clock $CK_Y$ generated from clock generated 56, so that recording signal $D_A$ is written in memory 57 by write circuit 65. The sixth embodiment is different from the fifth embodiment in that recording signal $D_A$ is written in the entire area of memory 57. In other words, in the sixth embodiment, the storage area of the memory is not divided into sections.

Recording signal $D_A$ which has been written in memory 57 is read by read circuit 72 on the basis of X-clock $CK_X$ and Y-clock $CK_Y$. X-address counter 94 in read processing circuit 158 for mixed signal C transforms horizontal synchronizing signal $H_B$ given from horizontal synchronizing signal separating circuit 96 into X-address signal $X_R$ in reference to X-clock $CK_X$. Y-address counter 95 in read processing circuit 158 transforms vertical synchronizing signal $V_B$ given from vertical synchronizing signal separating circuit 97 into Y-address signal $Y_R$ in reference to Y-clock $CK_Y$. Thus, recording signal $D_A$ stored in memory 57 is read by read circuit 72 on the basis of horizontal synchronizing signal $H_B$ and vertical synchronizing signal $V_B$ contained in second TV signal B. Recording signal $D_A$ thus read is converted into an analog signal by D/A converter 75, so that the analog signal is fed to changeover switch 104.

Further, switching signal $S_{VB}$ having a frequency twice the frequency of vertical synchronizing signal $V_B$ is given to changeover switch 104. Accordingly, changeover switch 104 alternatively sends out first analog TV signal $A^1$ given from D/A converter 75 and second analog TV signal B in the switching frequency of switching signal $S_{VB}$. In other words, first and second TV signals A and B are sent out in synchronism with the interlaced scanning that first TV signal A is sent out in one field and second TV signal B in the next field. At that time, the mixing of first and second TV signals A and B is perfected.

The image corresponding to mixed signal C at this time is shown in FIG. 20. At this time, changeover switch 159 is fixed to a contact position shown in FIG. 21 on the basis of multiple recording mode signal M which comes from timer circuit 6. Accordingly, mixed signal C is fed to output terminal 91.

In the following, the separating operation during the of reproducing according to the sixth embodiment is described in reference to FIG. 22.

During the reproducing of mixed signal C, multiple recording mode signal $M_p$ is given to separating circuit 152 from operation circuit 5, so that the VTR is set in a multiple recording signal reproduction mode.

Mixed signal C reproduced from video tape 8 through tape head 4 is fed to separating circuit 152 through signal processing circuit 2. In separating circuit 152, write processing circuit 176 generates combined recording signal $D_C$ on the basis of X-clock $CK_X$ and Y-clock $CK_Y$ generated by clock generator 79 and writes it in memory 77. Then combined recording signal $D_C$ is read from memory 77 by read processing circuit 78 on the basis of X-clock $CK_X$ and Y-clock $CK_Y$ and selectively or separately fed to changeover switch 90.

In write processing circuit 176, horizontal synchronizing signal $H_C$ separated by horizontal synchronizing signal separating circuit 80 is transformed into X read address signal $X_C$ by X-address counter 83, and vetical synchronizing signal $V_C$ separated by vertical synchronizing signal separating circuit 81 is transformed into Y read address signal $Y_C$ by Y-address counter 84. Further, in write processing circuit 176, video signal $VD_C$ is added thereto to generate combined recording signal $D_C$.

ON/OFF control of X-clock $CK_X$ and Y-clock $CK_Y$ which are given from clock generator 79 when X read address signal $X_C$ and Y read address signal $Y_C$ are generated, is carried out by clock switch 106 in synchronism with switching signal $SV_C$ having a frequency twice the frequency of vertical synchronizing signal $V_C$.

Switching signal $S_{VC}$ is logically inverted for every cycle of vertical synchronizing signal $V_C$. That is to say, the output of frequency divider 101 and selection signal $M_P$ given from operation circuit 5 are exclusively ORed by EXOR circuit 102. Assuming that selection signal $M_P$ for first TV signal A is "1", the output of EXOR gate 102 takes "1" when the output of frequency divider 101 is "0". As a result, clock switch 106 is turned on, so that first signal A is written in memory 77. In the next field, the output of frequency divider 101 becomes "1", so that first TV signal A is not written in memory 77. However, the reading operation for memory 77 is always carried out, so that one field of first TV signal A is sent out from D/A converter 89 again. On the contrary, assuming that second TV signal B is selected, selection signal MP becomes "0" so that second TV signal is written in memory 77 when the output of frequency divider 101 is "0".

As described above, one of first and second TV signals A and B is selectively taken out or separated from mixed signal C in reference to selection signal Mp.

The sixth embodiment as described above uses the interlaced scanning to switch alternatively first and second TV signals A and B to perform the mixing/separating. Further, the object of the sixth embodiment is also attained in that the mixing/separating is accomplished by switching first and second TV signals A and B alternatively for every horizontal scanning line with no interlaced scanning.

In the following, the seventh embodiment of the present invention will be described.

The seventh embodiment utilizes blanking portions of the video signal which has no video information in the front and rear portions of the vertical synchronizing signal in a NTSC type composite video signal or the like.

Figure 23:
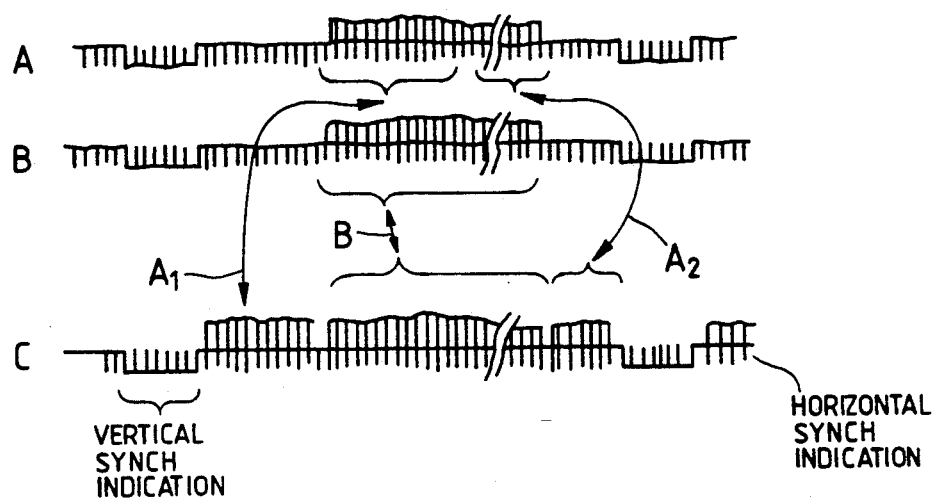
FIG. 23 is a time chart relating to mixing and separation according to the seventh embodiments.

For example, as shown in FIG. 23, while the video signal of second TV signal B is left as is, the video signal of first TV signal A is suitably divided, time-compressed and inserted in front and rear portions $A_1$ and $A_2$ respectively of the vertical synchronizing signal to generate mixed signal C.

According to the seventh embodiment, with respect to the video signal of a second TV signal B, a good resolution as usual can be attained, whereby the video signal is reproduced, although the VTR has no mixing/separating circuit as described in the aforementioned embodiments of the invention. However, an exclusive-use separable extension circuit is required for the reproducing of first TV signal A. The separable extension circuit has the function of separating circuit 52 in the fifth embodiment as shown in FIG. 18.

According to the fifth, sixth and seventh embodiments of the present invention, a multiple number of different programs in a same time slot are simultaneously recorded/reproduced. In particular, such feature is suitable for timer reserved recording.

Figure 24:
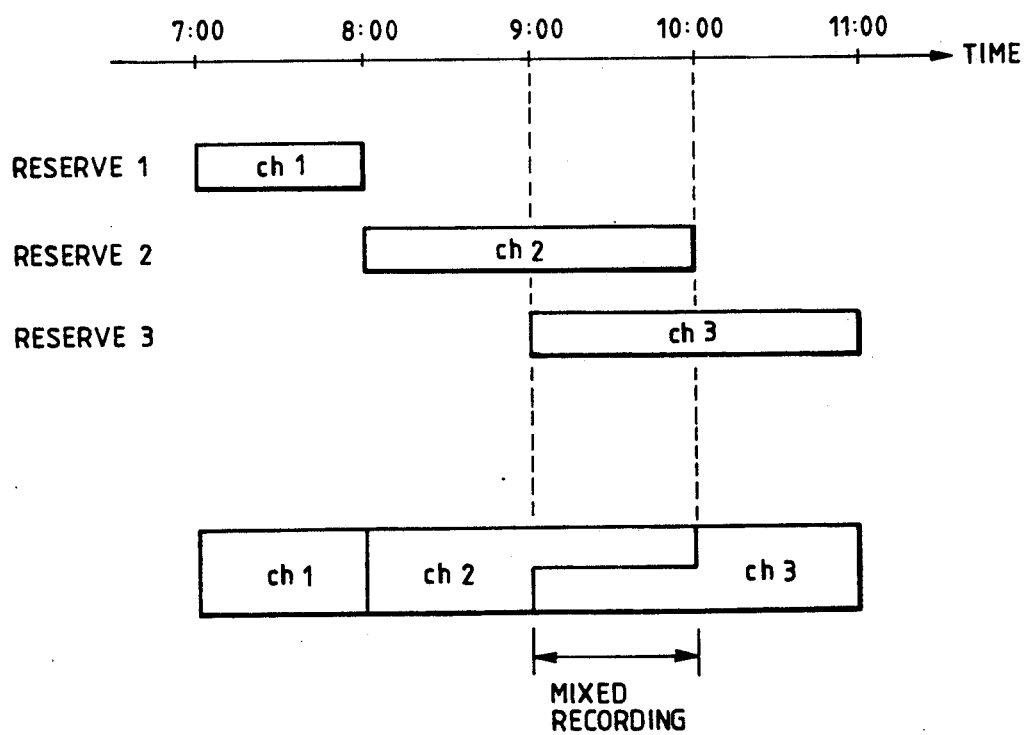
FIG. 24 is a time chart corresponding to multiple program reservation for video recording according to the present invention.

For example, as shown in FIG. 24, even through RESERVE 2 and RESERVE 3 overlap each other in a same time slot from 9:00 to 10:00, a mixed picture can be formed by a mixing circuit, for example, mixing circuit 51 shown in FIG. 15 to be recorded on the video tape in the same time slot, so that all programs can be recorded. If timer circuit 6 is arranged so that the operation mode signal is sent out at the operating time of timer circuit 6 when the overlapped time slot exists, the setting of a multiple recording mode is automatically carried out.

Thus, as shown in FIG. 24, all programs can be contained in the contents of recording.

In the fifth, sixth and seventh embodiments, the mixing/separating operation has been described by using first TV and second TV signals A and B obtained from first and second TV tuners 9 and 10 respectively. However, this invention is not limited to this specific arrangement. Various VTR input sources, such as TV, VTR and TV camera can be considered. A multiple number of TV signals obtained by combining any or all of these sources suitbaly can be recorded and reproduced. Accordingly, the multiple recording can be realized by providing respective exclusive-use video input terminals corresponding to such various kinds of VTR input sources.

In general, a VTR includes one tuner. Accordingly, if an adapter including an additional tuner, mixing circuit such as mixing circuit 51 in FIG. 15 and separating circuit such as separating circuit 52 in FIG. 15 as described in the present invention are provided, a conventional VTR can be easily adapted to a multiple program recording VTR which can simultaneously record/reproduce a multiple number of TV signals or programs in a same time period.

As described above, according to the present invention, a VTR can record a multiple number of TV signals in an overlapping recording time period simultaneously and reproduce the recorded TV signals.

In particular, according to the first through fourth embodiments of the present invention, the following effects can be attained.

In the first embodiment, the multiple recording can be made by mixing the first and second input recording signals alternatively while synchronizing these signals with one another for each field, to minimize the deterioration of recording picture quality.

In the second embodiment, a selected one of the first and second input recording signals can be separated from the mixed reproducing signal by controlling the writing of a corresponding field.

In the third embodiment, the multiple recording and reproducing for an excellent picture quality is obtained by a VTR, because the apparatus has both mixing and separating circuits.

In the fourth embodiment, the mixed recording and separated reproducing is made by a single circuit, so that the circuit construction is simplified and the size is reduced in addition to the aforementioned effects.

Other embodiments of the invention than those described in the present application will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A video tape recording and reproducing device comprising:
   a video head;
   means for receiving a plurality of video inputs corresponding to respective television programs;
   means, coupled to said receiving means, for providing a plurality of recording signals, each of the recording signals corresponding to a respective one of said video inputs;
   means for selecting one of said plurality of recording signals;
   means for storing said plurality of recording signals except said selected recording signal, said storing means including means for attaching a digital identifier to each of the recording signals to be stored to make stored recording signals distinguishable from the selected recording signal;

means, coupled to said storing means, for reading out the stored recording signals;

multiplexing circuit means, coupled to said reading out means and said selecting means, for alternately switching between the read out recording signals and said selected recording signal to generate a multiplexed signal simultaneously representing a combined plurality of the recording signals;

means for recording said multiplexed signal on said video head;

a separating circuit, coupled to said video head, for separating one of said plurality of recording signals from a recorded multiplexed signal, said separating circuit including means for detecting the identifier in the multiplexed signal; and an output circuit coupled to said separating circuit for providing the selected signal to an external device.

2. A video tape recording and reproducing device comprising:

a video head;

means for receiving a plurality of video inputs corresponding to respective television programs;

means, coupled to said receiving means, for providing a plurality of recording signals, each of the recording signals corresponding to a respective one of said video inputs;

means for selecting one of said plurality of recording signals;

means for storing said plurality of recording signals except said selected recording signal;

means, coupled to said storing means, for reading out the stored recording signals;

multiplexing circuit means, coupled to said reading out means and said selecting means, for alternately switching between the read out recording signals and said selected recording signal to generate a multiplexed signal simultaneously representing a combined plurality of the recording signals;

means for recording said multiplexed signal on said video head;

a separating circuit, coupled to said video head, for separating one of said plurality of recording signals from a recorded multiplexed signal;

an output circuit coupled to said separating circuit for providing the selected signal to an external device; and timer circuit means for presetting a recording start time and a recording end time separately for each of the provided plurality of recording signals, said timer circuit means providing a multiple recording operation mode signal to said multiplexing circuit means to activate said multiplexing circuit means during a multiple recording time period during which time period more than one recording time periods overlap, each recording time period having preset recording start and end times and corresponding to each one of the provided plurality of recording signals, and deleting said multiple recording operation mode signal during a single recording time period during which time period said recording time periods do not overlap.

3. A video tape recording and reproducing device for recording a multiplexed signal which simultaneously represents a combined plurality of television programs when in a recording mode and for reproducing any of the plurality of recorded television programs when in a reproducing mode, the device comprising:

a plurality of tunable means for respectively receiving the plurality of television programs and providing a plurality of respective recording signals when in the recording mode;

means for selecting one of said plurality of recording signals during the recording mode;

means for storing said plurality of recording signals except for a selected recording signal, said storing means including means for attaching a digital identifier to each of the recording signals to be stored to make the stored recording signal distinguishable from the selected recording signal;

means, coupled to said storing means, for reading out stored recording signals;

multiplexing circuit means, coupled to said reading out means and said selecting means, for alternately switching between the read out recording signals and said selected recording signal to generate a multiplexed signal simultaneously representing a combined plurality of the recording signals when in the recording mode;

recording means including a write head for recording said multiplexed signal on a video tape;

reading means including a read head, coupled to the recording means, for reading said multiplexed signal from the video tape when in the reproducing mode;

separating circuit means, coupled to the reading means, for separating one of said plurality of recording signals from said multiplexed signal, said separating circuit means including means for detecting the identifier in the multiplexed signal; and means, coupled to said separating circuit means, for providing said selected recording signal to an output circuit to which a reproduction device can be coupled.

4. A video tape recording device for recording a multiplexed signal which simultaneously represents a plurality of television programs on a video tape, the device comprising:

a plurality of tunable means for receiving means plurality of television programs and for providing a plurality of recording signals each corresponding to a respective television program;

means for selecting one of said plurality of recording signals during a recording mode;

means for storing said plurality of recording signals except for a selected one of the recording signals, said storing means including means for attaching a digital identifier to each of the recording signals to be stored to make the stored recording signal distinguishable from the selected recording signal;

means, coupled to said storing means, for reading out the stored recording signals;

multiplexing circuit means, coupled to said reading out means and said selecting means, for alternately switching between the read out recording signals and said selected recording signal to generate a multiplexed signal simultaneously representing a combined plurality of the recording signals; and recording means including a write head, coupled to the multiplexing circuit means, for recording said multiplexed signal on the video tape.

5. A video tape reproducing device for reproducing a single television program from a video tape having a multiplexed signal recorded thereon which simultaneously represents a combined plurality of television programs and which signal has therein a digital identifier for identifying one of the plurality of television programs, the device comprising:
- reading means having a read head for reading the multiplexed signal from the video tape;
- means for storing said multiplexed signal in a storage medium;
- separating circuit means, coupled to said storing means, for reading out said multiplexed signal at a predetermined time interval to separate one of the recording signals corresponding to the single one of said plurality of television programs from said multiplexed signal, the separating circuit means including means for detecting said identifier; and
- means, coupled to the separating circuit means, for providing the separated recording signal to an output circuit coupled to display means for producing the single television program.

6. The device of claim 3, wherein the multiplexing circuit means and separating circuit means comprise a common circuit which is responsive to the plurality of tunable means which common circuit functions as the multiplexing circuit means at times when the device is in the recording mode and which common circuit is responsive to the reading means and which common circuit functions as the separating circuit means at times when the device is in the reproducing mode, the means for attaching a digital identifier being inactive during the reproducing mode.

7. The device of claim 3, wherein the multiplexing circuit means and the separating circuit means are substantially separated and distinct from one another.

8. The device of claim 3,
- wherein the multiplexing circuit means includes control circuit means for controlling the storing of said provided recording signals in relation to said selected recording signal.

9. A video tape recording and reproducing device for recording a multiplexed signal which simultaneously represents a combined plurality of television programs when in a recording mode and for reproducing any of the plurality of recorded television programs when in a reproducing mode, the device comprising:
- a plurality of tunable means for respectively receiving the plurality of television programs and providing a plurality of respective recording signals when in the recording mode;
- means for selecting one of said plurality of recording signals during the recording mode;
- means for storing said plurality of recording signals by specifying distinguishable memory addresses for each of the recording signals;
- means, coupled to said storing means, for reading out the stored recording signals;
- multiplexing circuit means, coupled to said reading out means and said selecting means, for alternately switching between the read out recording signals and said selected recording signal to generate a multiplexed signal simultaneously representing a combined plurality of the recording signals when in the recording mode, the multiplexing circuit means including means for setting the frequency of the alternate switching of the multiplexing circuit means in reference to the scanning frequency of one of two interlaced fields of an NTSC composite video signal;
- recording means including a write head for recording said multiplexed signal on a video tape;
- reading means including a read head, coupled to the recording means, for reading said multiplexed signal from the video tape when in the reproducing mode;
- separating circuit means, coupled to the reading means, for separating one of said plurality of recording signals from said multiplexed signal; and
- means, coupled to said separating circuit means, for providing said selected recording signal to an output circuit to which a reproduction device can be coupled.

10. A video tape recording and reproducing device for recording a multiplexed signal which simultaneously represents a combined plurality of television programs when in a recording mode and for reproducing any of the plurality of recorded television programs when in a reproducing mode, comprising:
- a plurality of tunable means for respectively receiving the plurality of television programs and providing a plurality of respective recording signals when in the recording mode;
- means for selecting one of said plurality of recording signals during the recording mode;
- means for storing said plurality of recording signals, the storing means including means for synchronizing said provided recording signals with the corresponding synchronizing signals and deriving distinguishable memory addresses for each of the recording signals to store said provided recording signals;
- means, coupled to said storing means, for reading out the stored recording signals;
- multiplexing circuit means, coupled to said reading out means and said selecting means, for alternately switching between the read out recording signals and said selected recording signal to generate a multiplexed signal simultaneously representing a combined plurality of the recording signals when in the recording mode, said multiplexing circuit means including means for alternately switching in association with the corresponding synchronizing signals;
- recording means including a write head for recording said multiplexed signal on a video tape;
- reading means including a read head, coupled to the recording means, for reading said multiplexed signal from the video tape when in the reproducing mode;
- separating circuit means, coupled to the reading means, for separating one of said plurality of recording signals from said multiplexed signal; and
- means, coupled to said separating circuit means, for providing said selected recording signal to an output circuit to which a reproduction device can be coupled.

11. The device of claim 10, further including means for setting the corresponding synchronizing signal in reference to a vertical synchronizing signal of an NTSC composite video signal.

12. The device of claim 10, wherein the storing means has a plurality of sections, each section storing a respective one of said recording signals.

13. A video tape recording device for recording a multiplexed signal which simultaneously represents a combined plurality of television programs on a video tape, the device comprising:

a plurality of tunable means for receiving said plurality of television programs and for providing a plurality of recording signals each corresponding to a respective television program;

means for selecting one of said plurality of recording signals during a recording mode;

means for storing said plurality of recording signals except for a selected one of the recording signals, said storing means including means for attaching a digital identifier to each of the recording signals to be stored to make the stored recording signals readily distinguishable from the selected recording signal;

means, coupled to said storing means, for reading out the stored recording signals;

multiplexing circuit means, coupled to said reading out means and said selecting means, for alternately switching between the read out recording signals and said selected recording signal to generate a multiplexed signal simultaneously representing a combined plurality of recording signals, the multiplexing circuit means including control circuit means, responsive to the storing means and to the plurality of tunable means, for generating control signals for controlling the reading out of said stored recording signals in association with said selected recording signal; and recording means including a write head, coupled to the multiplexing circuit means, for recording said multiplexed signal on the video tape.

14. A video tape recording device for recording a multiplexed signal which simultaneously represents a combined plurality of television programs on a video tape, the device comprising:

a plurality of tunable means for receiving said plurality of television programs and for providing a plurality of recording signals each corresponding to a respective television program;

means for selecting one of said plurality of recording signals during a recording mode;

means for storing said plurality of recording signals, said storing means including means for specifying distinguishable memory addresses for each of the recording signals;

means, coupled to said storing means, for reading out the stored recording signals;

multiplexing circuit means, coupled to said reading out means and said selecting means, for alternately switching between the read out recording signals and said selected recording signal to generate a multiplexed signal simultaneously representing a combined plurality of the recording signals, the multiplexing circuit including;

means for setting the frequency of the alternate switching of the multiplexing means in reference to the scanning frequency of one of two interlaced fields of an NTSC composite video signal, and control circuit means, responsive to the storing means and to the plurality of tunable means, for generating control signals for controlling the reading out of said stored recording signals in association with said selected recording signal; and recording means including a write head, coupled to the multiplexing circuit means, for recording said multiplexed signal on the video tape.

15. A video tape recording device for recording a multiplexed signal which simultaneously represents a plurality of television programs on a video tape, the device comprising:

a plurality of tunable means for receiving said plurality of television programs and for providing a plurality of recording signals each corresponding to a respective television program;

means for selecting one of said plurality of recording signals during a recording mode;

means for storing said plurality of recording signals, the storing means including means for synchronizing said provided recording signals with corresponding synchronizing signals and deriving distinguishable memory addresses for each of the recording signals to store said provided recording signals;

means, coupled to said storing means, for reading out the stored recording signals;

multiplexing circuit means, coupled to said reading out means and said selecting means, for alternately switching between the read out recording signals and said selected recording signal to generate a multiplexed signal simultaneously representing a combined plurality of the recording signals, said multiplexing circuit means including means for alternately switching in association with the corresponding synchronizing signals; and recording means including a write head, coupled to the multiplexing circuit means, for recording said multiplexed signal on the video tape.

16. The device of claim 15, further including means for setting the corresponding synchronizing signal in reference to a vertical synchronizing signal of an NTSC composite video signal.

17. The device of claim 15, wherein the storing means has a plurality of sections, each section storing a corresponding one of the stored recording signals.

18. A video tape recording and reproducing device for recording a multiplexed signal which simultaneously represents a combined plurality of television programs when in a recording mode and for reproducing any of the plurality of recorded television programs when in a reproducing mode, the device comprising:

a plurality of tunable means for respectively receiving the plurality of television programs and providing a plurality of respective recording signals when in the recording mode;

means for selecting one of said plurality of recording signals during the recording mode;

means for storing said plurality of recording signals except for a selected one of the recording signals, said storing means including means for attaching a digital identifier to each of the recording signals to be stored to make the stored recording signals distinguishable from the selected recording signal;

means, coupled to said storing means, for reading out the stored recording signals;

multiplexing circuit means, coupled to said reading out means and said selecting means, for alternately switching between the read out recording signals and said selected recording signal to generate a multiplexed signal simultaneously representing a combined plurality of the recording signals when in the recording mode;

recording means including a write head for recording said multiplexed signal on video tape;

reading means including a read head, coupled to the recording means, for reading said multiplexed signal from the video tape when in the reproducing mode;

separating circuit means, coupled to the reading means, for separating one of said plurality of recording signals from said multiplexed signal, said separating circuit means including means for detecting the identifiers in the multiplexed signal and means, coupled to the reading means, for storing the read multiplexed signal;

control circuit means for generating control signals for controlling the reading of the stored multiplexed signal from the storing means at predetermined times; and means, coupled to said separating circuit means, for providing said selected recording signal to an output circuit to which a reproduction device can be coupled.

19. A video tape recording and reproducing device for recording a multiplexed signal which simultaneously represents a combined plurality of television programs when in a recording mode and for reproducing at least one of the plurality of recorded television programs when in a reproducing mode, the device comprising:

a plurality of tunable means for respectively receiving the plurality of television programs and providing a plurality of respective recording signals when in the recording mode;

means for selecting one of said plurality of recording signals during the recording mode;

means for storing said plurality of recording signals, the storing means including means for specifying distinguishable memory addresses for each of the recording signals;

means, coupled to said storing means, for reading out the stored recording signals;

multiplexing circuit means, coupled to said reading out means and said selecting means, for alternately switching between the read out recording signals and said selected recording signal to generate a multiplexed signal simultaneously representing a combined plurality of the recording signals when in the recording mode;

recording means including a write head for recording said multiplexed signal on a video tape;

reading means including a read head, coupled to the recording means, for reading said multiplexed signal from the video tape when in the reproducing mode;

separating circuit means, coupled to the reading means, for separating one of said plurality of recording signals from said multiplexed signal, said separating means including means, coupled to the reading means, for storing the read multiplexed signal;

control circuit means for generating control signals for controlling the reading of the stored multiplexed signal from the storing means at predetermined times, said control circuit means including means for setting said predetermined times in reference to the scanning frequency of one of two interlaced fields of an NTSC composite video signal; and means, coupled to said separating circuit means, for providing said selected recording signal to an output circuit to which a reproduction device can be coupled.

20. A video tape recording and reproducing device for recording a multiplexed signal which simultaneously represents a combined plurality of television programs when in a recording mode and for reproducing any of the plurality of recorded television programs when in a reproducing mode, the device comprising:

a plurality of tunable means for respectively receiving the plurality of television programs and providing a plurality of respective recording signals when in the recording mode;

means for selecting one of said plurality of recording signals during the recording mode;

means for storing said plurality of recording signals, the storing means including means for specifying distinguishable memory addresses for each of the recording signals;

means, coupled to said storing means, for reading out the stored recording signals;

multiplexing circuit means, coupled to said reading out means and said selecting means, for alternately switching between the read out recording signals and said selected recording signal to generate a multiplexed signal simultaneously representing a combined plurality of the recording signals when in the recording mode;

recording means including a write head for recording said multiplexed signal on a video tape;

reading means including a read head, coupled to the recording means, for reading said multiplexed signal from the video tape when in the reproducing mode, the recording multiplexed signal reading means including means for synchronizing the recorded multiplexed signal with corresponding synchronizing signals;

separating circuit means, coupled to the reading means, for separating one of said plurality of recording signals from said multiplexed signal, the separating circuit means including means, coupled to the reading means, for storing the read multiplexed signal;

control circuit means for generating control signals for controlling the reading of the stored multiplexed signal from the storing means at predetermined times; and means, coupled to said separating circuit means, for providing said selected recording signal to an output circuit to which a reproduction device can be coupled.

21. The device of claim 20, further including means for setting the corresponding synchronizing signals in reference to a vertical synchronizing signal of the NTSC composite video signal.

22. A video tape reproducing device for reproducing a single television program from a video tape having a multiplexed signal recorded thereon which simultaneously represents a combined plurality of television programs, the device comprising:

reading means having a read head for reading the multiplexed signal from the video tape;

means for storing the read multiplexed signal in a storage medium with distinguishable memory addresses for each of the recorded signals in the multiplexed signal;

separating circuit means, coupled to said storing means, for reading out said multiplexed signal at a predetermined time interval to separate one of the recording signals corresponding to the single one of the plurality of television programs from the stored multiplexed signal, the separating circuit means including:

control circuit means for generating control signals for controlling the reading of the stored read multiplexed signal, the control circuit means including means for deriving the distinguishable memory addresses of the recorded signals in the multiplexed signal; and means, coupled to the separating circuit means, for providing a separated one of the recording signals to an output circuit coupled to display means for producing the selected television program.

23. The device of claim 22, further including means for setting said predetermined times in reference to the scanning frequency of one of two interlaced fields of an NTSC composite video signal.

24. The device of claim 22, wherein said separating circuit means includes means for synchronizing the stored multiplexed signal with corresponding synchronizing signals.

25. The device of claim 24, further including means for setting the corresponding synchronizing signal in reference to a vertical synchronizing signal of an NTSC composite video signal.

26. A method of recording a plurality of television programs on the same length of a video tape when in a recording mode and for reproducing a selected one of said plurality of television programs when in a reproducing mode, the method comprising the steps of:

generating a plurality of recording signals, each corresponding to a respective television program when in the recording mode;

selecting one of said plurality of recording signals;

storing said plurality of recording signals except for said selected recording signal in a storage medium, the storing steps including attaching a digital identifier to each of the stored recording signals to be stored to make the stored recording signal distinguishable from the selected reading signal;

reading out the stored recording signals from the storage medium;

alternately switching between the read out recording signals and the selected recording signal to produce a multiplexed signal simultaneously representing a combined plurality of recording signals;

recording said multiplexed signal on the video tape;

reading said multiplexed signal from the video tape when in the reproducing mode;

reproducing a selected one of said plurality of recording signals from said multiplexed signal, the reproducing step including detecting any identifier in the read multiplexed signal; and providing said reproduced recording signal to an external device for displaying the corresponding television program.

27. The method of claim 26, wherein the multiplexed signal producing step includes generating control signals for controlling the reading of the stored recording signals in association with the selected recording signal.

28. The method of claim 27, wherein the storing substep includes storing the generated recording signals in said storage medium in reference to said selected recording signal.

29. A method for recording a plurality of television programs multiplexed on a video tape, the method comprising the steps of:

generating a plurality of recording signals, each of the recording signals corresponding to a respective one of said plurality of the television programs;

selecting one of said plurality of recording signals during the recording mode;

storing said plurality of recording signals except for said attaching recording signal, the storing step including attaching a digital identifier to each of the recording signals to be stored to make the stored recording signals distinguishable from the selected recording signal;

reading out said stored recording signals;

alternately switching between said read out recording signals and said selected recording signal to produce a multiplexed signal simultaneously representing a combined plurality of recording signals; and recording said multiplexed signal on the video tape.

30. A method for reproducing a selected one of a plurality of television programs from a video tape having a multiplexed signal simultaneously representing a combined plurality of recording signals, one of which is associated with a digital identifier, each recording signal corresponding to a respective one of said plurality of television programs, the method comprising the steps of:

reading said multiplexed signal recorded on the video tape;

storing said read multiplexed signal in a storage medium;

reading out said stored multiplexed signal at a predetermined time interval to reproduce a signal corresponding to said selected one of a plurality of television programs from the multiplexed signal, the reading step including detecting the identifier; and providing the reproduced signal to an external device for producing the selected television program.

31. A method of recording a plurality of television programs on the same length of a video tape when in a recording mode and for reproducing a selected one of said plurality of television programs when in a reproducing mode, the method comprising the steps of:

generating a plurality of recording signals, each corresponding to a respective television program when in the recording mode;

selecting one of said plurality of recording signals;

storing said plurality of recording signals in a storage medium, the storing step including specifying distinguishable memory addresses for each of the recording signals;

reading out the stored recording signals from the storage medium;

alternately switching between the read out recording signals and the selected recording signal to produce a multiplexed signal simultaneously representing a combined plurality of recording signals;

recording said multiplexed signal on the video tape;

reading said multiplexed signal from the video tape when in the reproducing mode;

reproducing a selected one of said plurality of recording signals from said multiplexed signal; and providing said reproducing recording signal to an external device for displaying the corresponding television program, wherein the multiplexed signal producing step includes generating control signals for controlling the reading of the stored recording signals in association with the selected recording signal, and referencing two interlaced fields of an NTSC composite video signal, and setting the frequency of said alternate switching in reference to the scanning frequency of the NTSC composite video signal.

32. A method of recording a plurality of television programs on the same length of a video tape when in a recording mode and for reproducing a selected one of said plurality of television programs when in a reproducing mode, the method comprising the steps of:
generating a plurality of recording signals, each corresponding to a respective television program when in the recording mode;
selecting one of said plurality of recording signals;
storing said plurality of recording signals in a storage medium, the storing step including specifying distinguishable memory addresses for each of the recording signals;
reading out the stored recording signals from the storage medium;
alternately switching between the read out recording signals and the selected recording signal to produce a multiplexed signal simultaneously representing a combined plurality of recording signals;
recording said multiplexed signal on the video tape;
reading said multiplexed signal from the video tape when in the reproducing mode;
reproducing a selected one of said plurality of recording signals from said multiplexed signal, the reproducing; and
providing said reproduced recording signal to an external device for displaying the corresponding television program,
wherein the multiplexed signal producing step includes alternately switching between the read stored recording signals and the selected recording signal in association with corresponding synchronizing signals.

33. The method of claim 32, wherein said generated recording signal storing step includes setting the corresponding synchronizing signal in reference to a vertical synchronizing signal of the NTSC composite video signal.

34. The method of claim 32, wherein said storage medium has a plurality of sections, and said generated recording signal storing step includes storing a different one of the plurality of generated recording signals in a corresponding one of the plurality of sections.

35. A method of recording a plurality of television programs on the same length of a video tape when in a recording mode and for reproducing a selected one of said plurality of television programs when in a reproducing mode, comprising the steps of:
generating a plurality of recording signals, each corresponding to a respective television program when in the recording mode;
selecting one of said plurality of recording signals;
storing said plurality of recording signals in a storage medium, the storing step including specifying distinguishable memory addresses for each of the recording signals;
reading out the stored recording signals from the storage medium;
alternately switching between the read out recording signals and the selected recording signal to produce a multiplexed signal simultaneously representing a combined plurality of recording signals;
recording said multiplexed signal on the video tape;
reading said multiplexed signal from the video tape when in the reproducing mode;
reproducing a selected one of said plurality of recording signals from said multiplexed signal; and
providing said reproducing recording signal to an external device for displaying the corresponding television program, wherein the selected signal reproducing step includes:
storing the multiplexed signal read by the reading step in a storage medium by specifying distinguishable memory addresses to have orthogonal coordinates for each of the stored signals; and
generating control signals for controlling the reading of the recorded multiplexed signal.

36. The method of claim 35, wherein said control signal generating substep includes setting said predetermined times in reference to the scanning frequency of one of two interlaced fields of an NTSC composite video signal.

37. A method of recording a plurality of television programs on the same length of a video tape when in a recording mode and for reproducing a selected one of said plurality of television programs when in a reproducing mode, comprising the steps of:
generating a plurality of recording signals, each corresponding to a respective television program when in the recording mode;
selecting one of said plurality of recording signals;
storing said plurality of recording signals except for said selected recording signal in a storage medium, the storing step including specifying distinguishable memory addresses for each of the recording signals;
reading out the stored recording signals for the storage medium;
alternately switching between the read out recording signals and the selected recording signal to produce a multiplexed signal simultaneously representing a combined plurality of recording signals;
recording said multiplexed signal on the video tape;
reading said multiplexed signal from the video tape when in the reproducing mode;
reproducing a selected one of said plurality of recording signals from said multiplexed signal; and
providing said reproducing recording signal to an external device for displaying the corresponding television program,
wherein the recording multiplexed signal reading step includes synchronizing the recorded multiplexed signal with the corresponding synchronizing signals.

38. The method of claim 37, further including the step of setting the corresponding synchronizing signal in reference to a vertical synchronizing signal of the NTSC composite video signal.

39. A video tape recording and reproducing device for recording a plurality of television programs multiplexed on a video tape when in a recording mode and for reproducing a selected one of said plurality of television programs when in a reproducing mode, the device comprising:
a plurality of tunable means for receiving a plurality of respective television programs and for providing a plurality of recording signals, each corresponding to a respective television program when in the recording mode;
means for selecting one of said plurality of recording signals during the recording mode;

means for storing said recording signals except for a selected recording signal, said storing means including means for attaching a digital identifier to each signal to be stored to make it distinguishable from the selected recording signal;

means, coupled to said storing means, for reading out stored recording signals;

multiplexing circuit means, coupled to said reading out means and said selecting means, for alternately switching between read out recording signals and said selected recording signal to generate a multiplexed signal simultaneously representing a combined plurality of recording signals when in the recording mode;

recording means including a write head for recording said multiplexed signal on the video tape;

reading means including a read head, coupled to the recording means, for reading said multiplexed signal from the video tape when in the reproducing mode;

means, coupled to said reading means, for storing a read multiplexed signal;

separating circuit means, coupled to the reading means, for outputting the stored multiplexed signal at a predetermined time interval to separate a selected one of the plurality of recording signals from the stored multiplexed signal, including means for detecting any identifier therein; and means, coupled to the separating circuit means, for providing a separated recording signal to an output circuit to which a reproduction device can be coupled, wherein each one of said plurality of recording signals includes a corresponding audio signal.

40. The video tape device of claim 39, wherein said recording means includes one or more audio channels for recording a respective one of the audio signals of said one or more video inputs on a tape.

41. The video tape device of claim 40 wherein said separating means includes means for separating from the multiplexed signal a respective one of the audio signals of said selected one of the plurality of signals.

* * * * *

UNITED STATES PATENT AND TRADEMARK OFFICE
CERTIFICATE OF CORRECTION

PATENT NO. : 5,187,589
DATED : February 16, 1993
INVENTOR(S) : Mutsumi Kono et al.

It is certified that error appears in the above-indentified patent and that said Letters Patent is hereby corrected as shown below:

Claim 4, column 26, line 43, change "means" (second ocurrence) to --said--.

Claim 16, column 29, line 54, change "including;" to -- including:--.

Claim 20, column 32, line 33, change "recording" to --recorded--.

Claim 32, column 35, lines 29-30, delete "the reproducing".

Claim 33, column 35, line 42, change "the" to --an--.

Signed and Sealed this

First Day of March, 1994

Attest:

BRUCE LEHMAN

Attesting Officer     Commissioner of Patents and Trademarks